United States Patent [19]
Cairns et al.

[11] Patent Number: 6,017,227
[45] Date of Patent: Jan. 25, 2000

[54] UNDERWATER CONNECTOR

[75] Inventors: James L. Cairns; Stewart M. Barlow, both of Ormond Beach, Fla.

[73] Assignee: Ocean Design, Inc., Ormond Beach, Fla.

[21] Appl. No.: 08/993,730

[22] Filed: Dec. 18, 1997

Related U.S. Application Data

[63] Continuation-in-part of application No. 08/612,371, Mar. 7, 1996, Pat. No. 5,738,535.

[51] Int. Cl.⁷ .................................................... H01R 13/44
[52] U.S. Cl. .......................... 439/138; 439/201; 439/310; 439/271
[58] Field of Search ..................... 439/137–139, 439/143, 201, 199, 205, 203, 204, 271, 587, 310; 385/56, 58, 60

[56] References Cited

U.S. PATENT DOCUMENTS

| | | |
|---|---|---|
| 3,982,804 | 9/1976 | Marechal ................... 439/139 |
| 4,203,640 | 5/1980 | Bice et al. ................. 439/139 |
| 5,234,350 | 8/1993 | Marechal et al. ........... 439/139 |
| 5,645,438 | 7/1997 | Cairn . | |

FOREIGN PATENT DOCUMENTS 615452  7/1935  Germany .

*Primary Examiner*—Gary F. Paumen
*Attorney, Agent, or Firm*—Brown, Martin, Haller & McClain, LLP

[57] ABSTRACT

An underwater electro-optical connector assembly has a plug unit containing at least one contact element in a bore within the plug body and a receptacle unit containing at least one contact element in a bore aligned with the plug bore when the two parts are mated together. Each of the bores terminates in an enlarged, recessed seat at the front or mating face of the respective unit, and a seal member is movably mounted in each seat. Each seal member has a through bore aligned with the respective bores in the two units when in an open position, and offset from the contact element bores in a closed position so as to seal the bores until the parts are connected. Portions of each seal member project outwardly from the front face to make a good seal when the two front faces are pushed together. The seal members are actuated to move from the closed position to the open position automatically as the two units are mated, and the contact element in the plug unit then extends out of the plug body through the aligned seal member through bores and into the receptacle bore to contact the corresponding receptacle contact element.

35 Claims, 21 Drawing Sheets

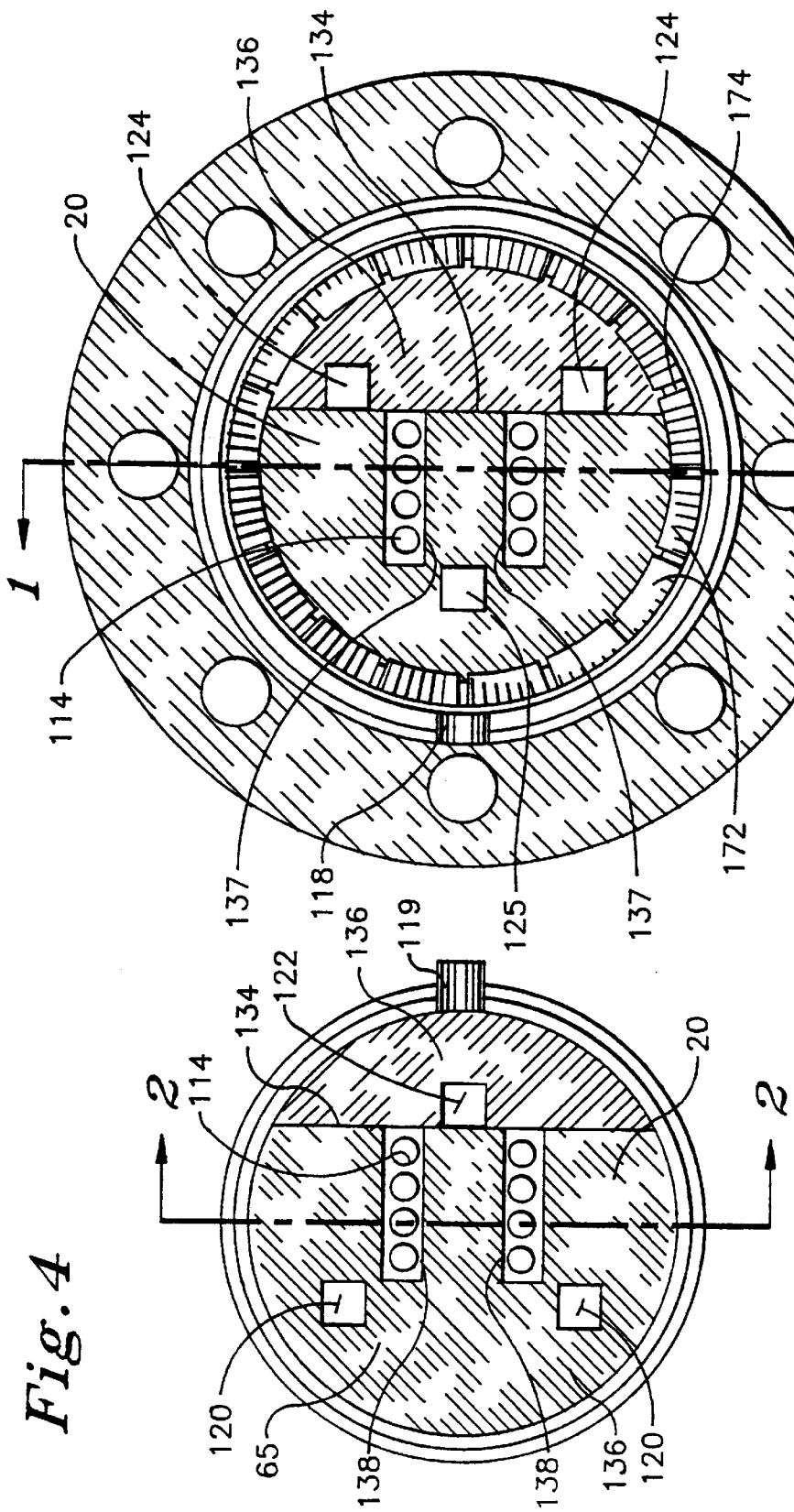

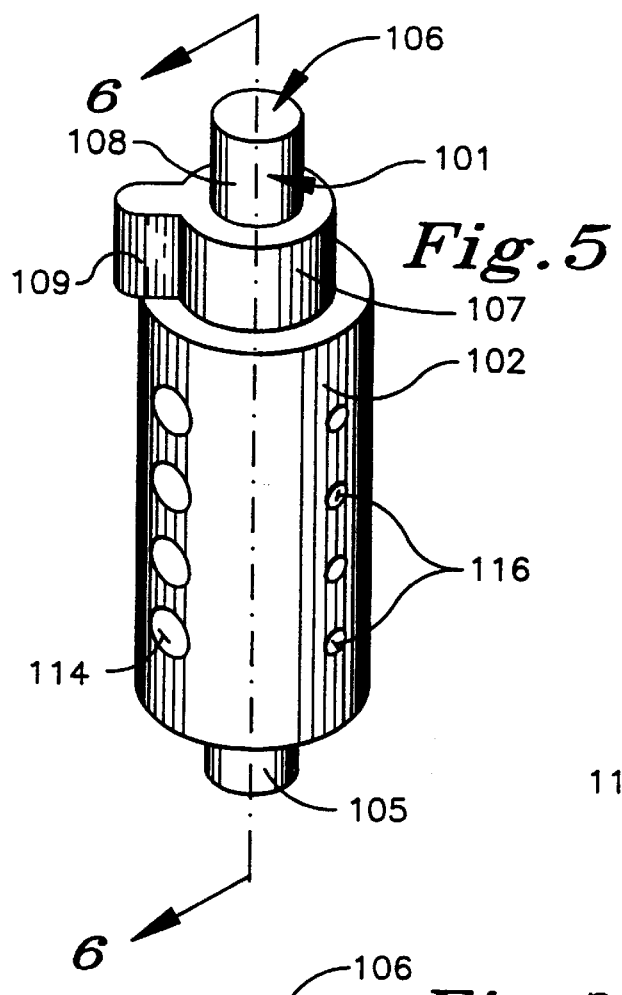
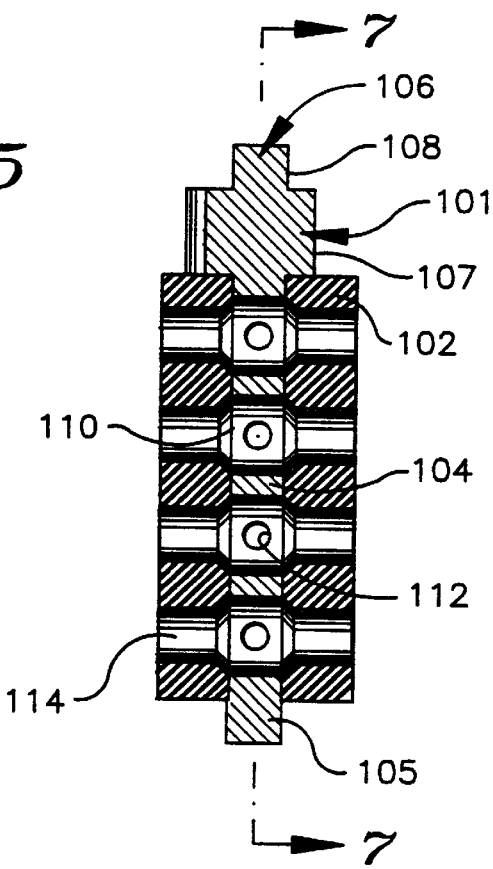
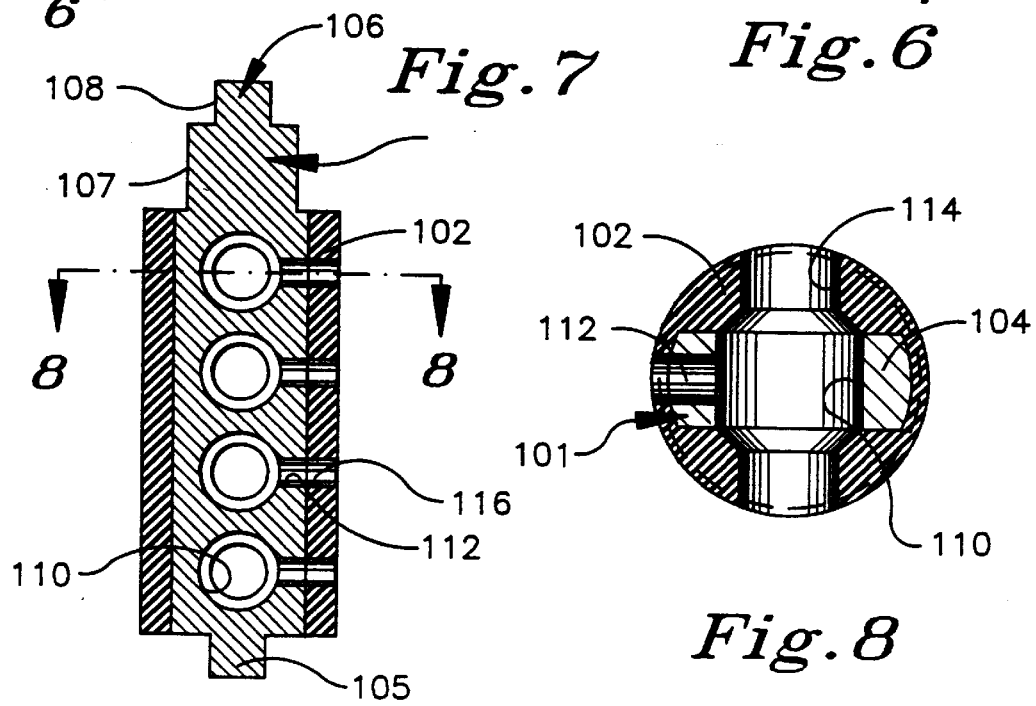

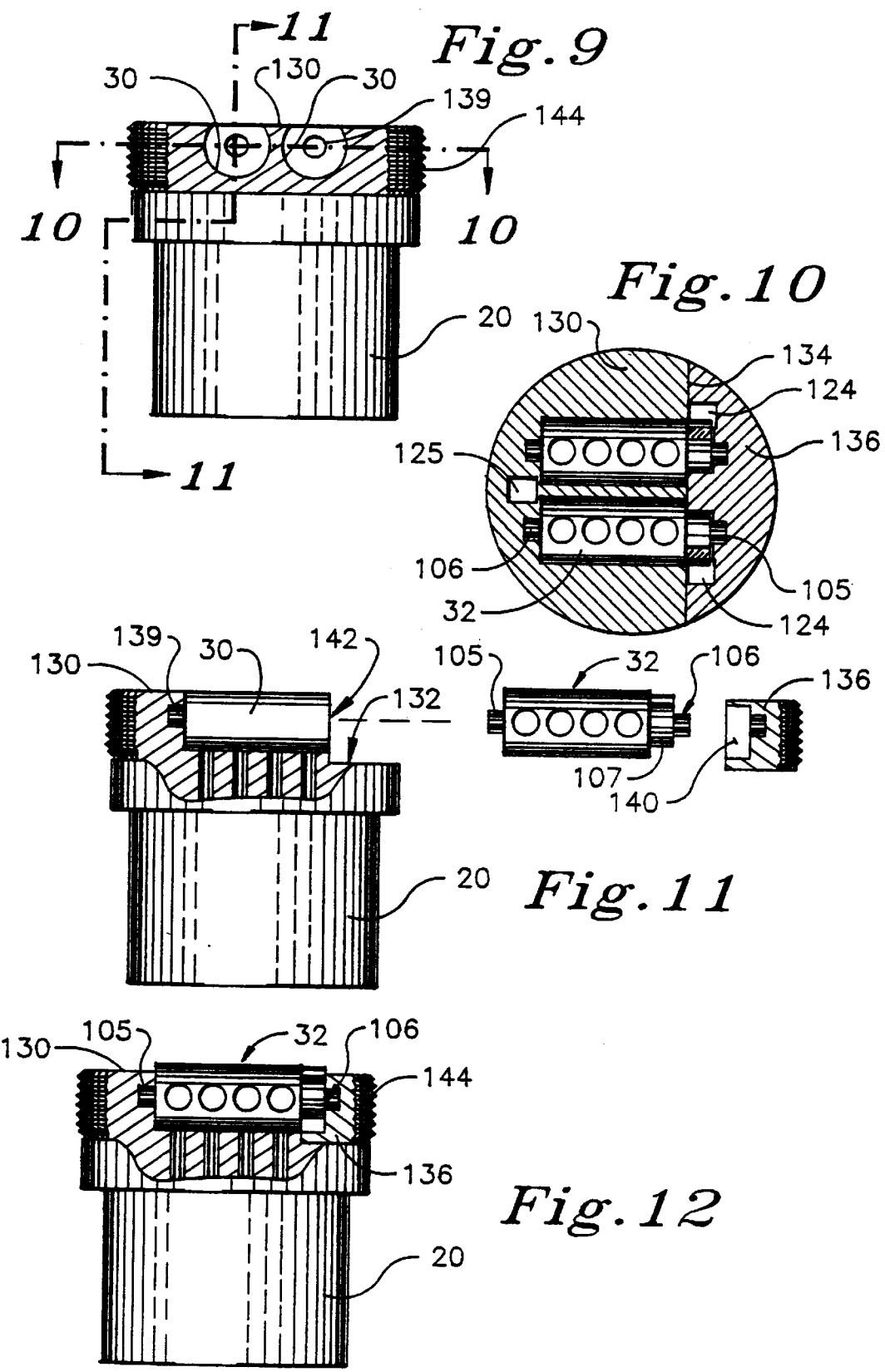

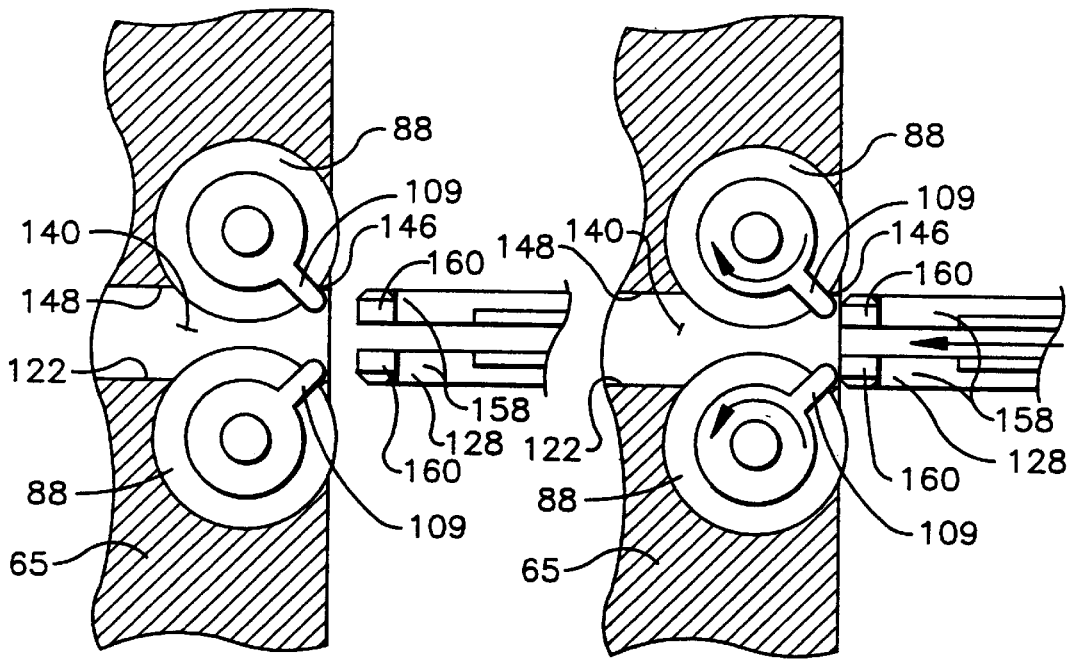
*Fig. 14A*  *Fig. 14B*
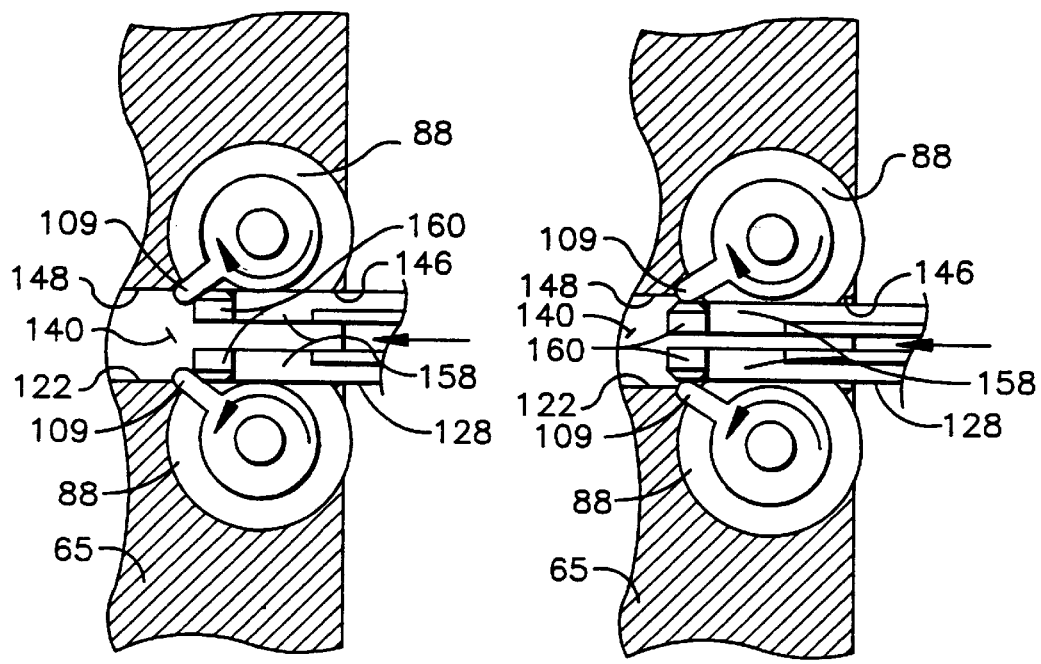
*Fig. 14C*  *Fig. 14D*

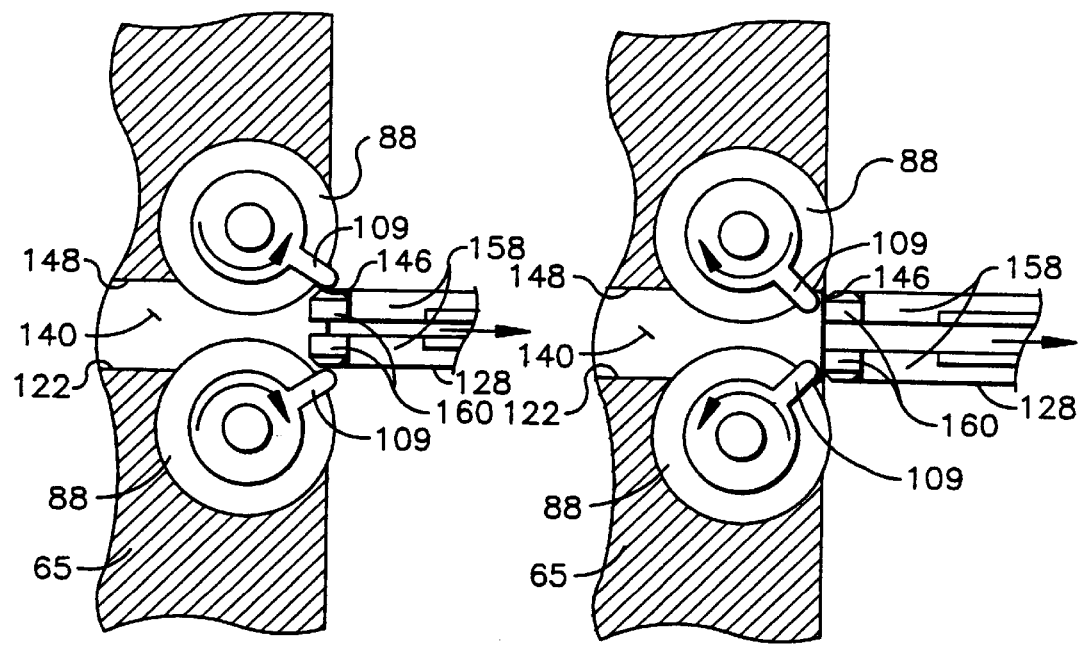

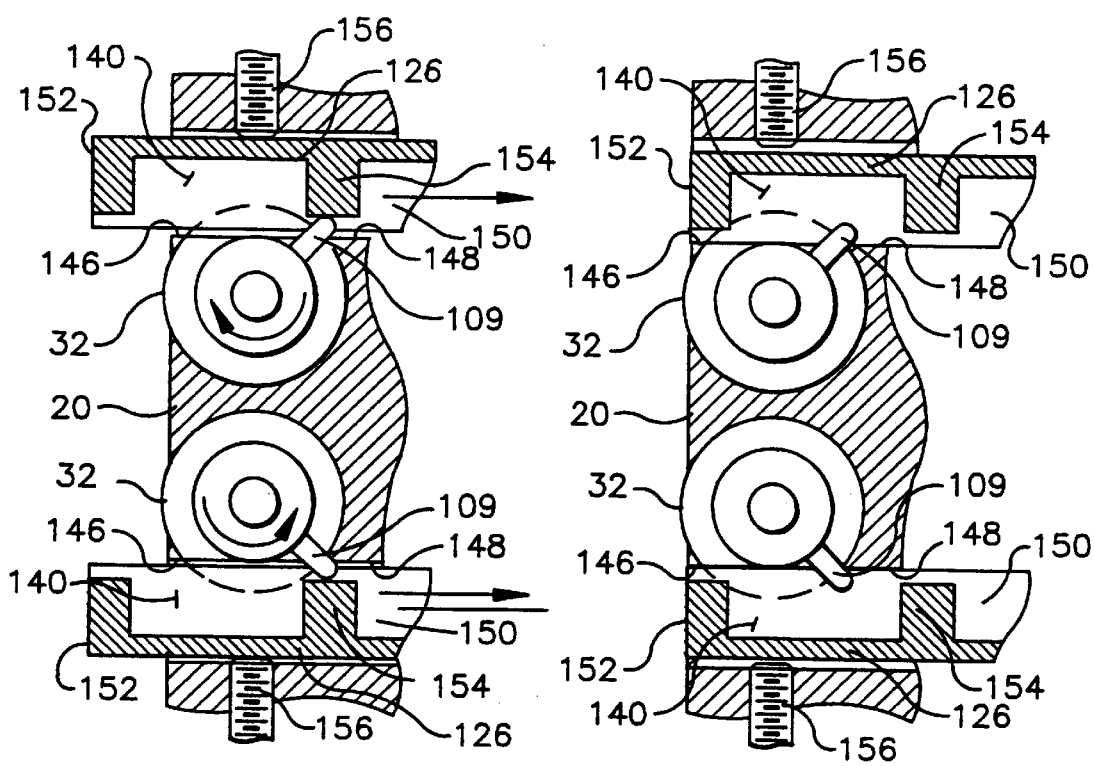

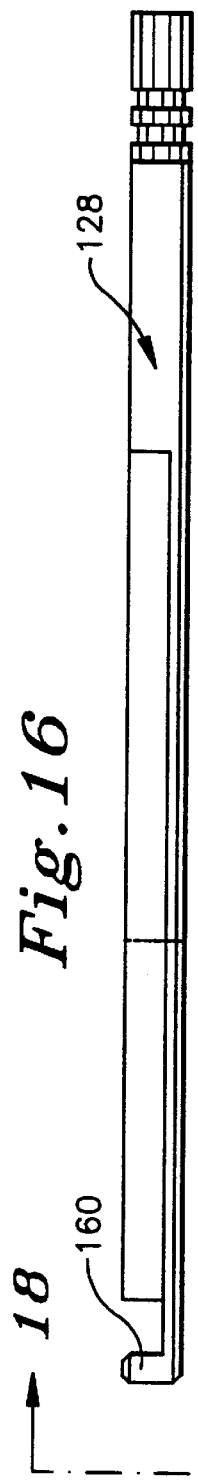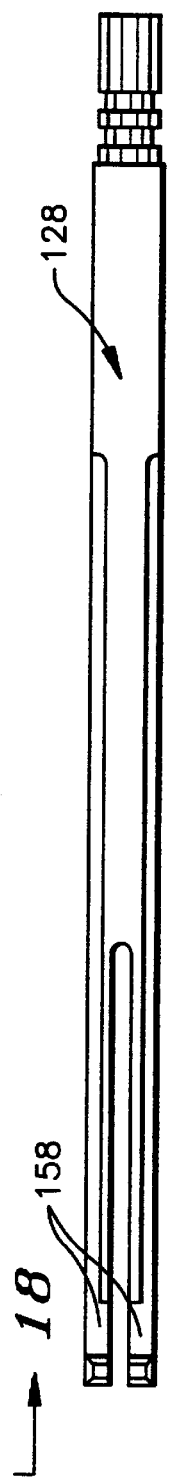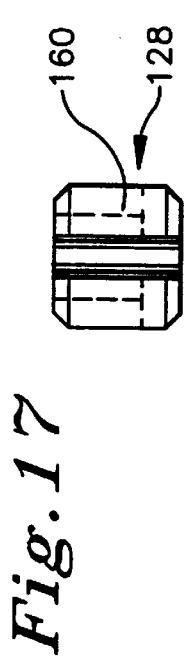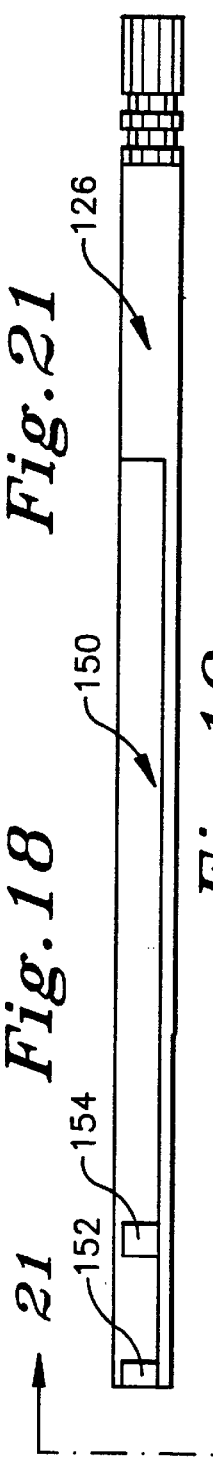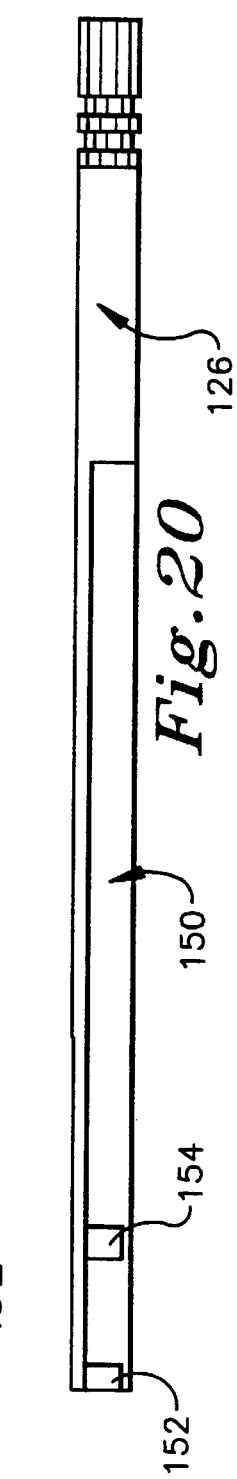

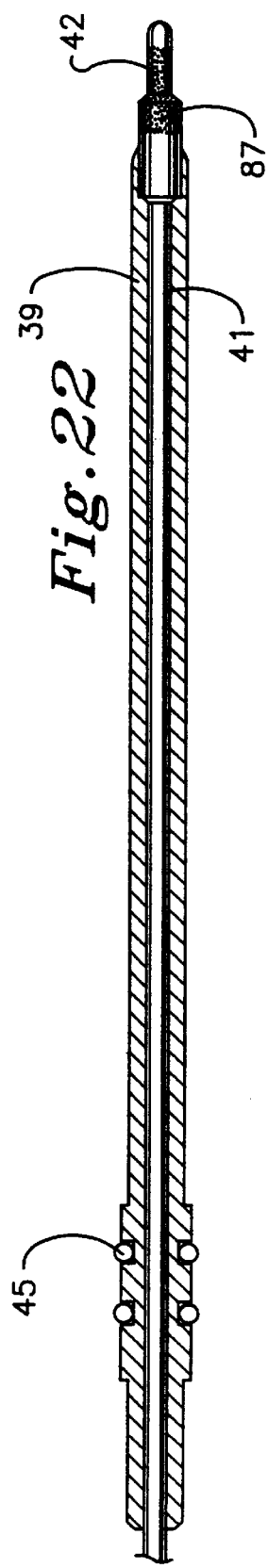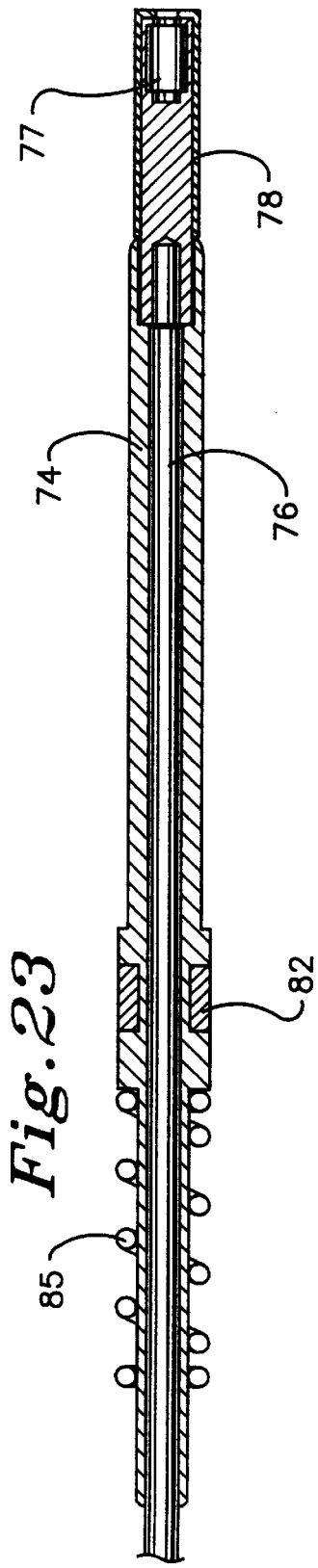

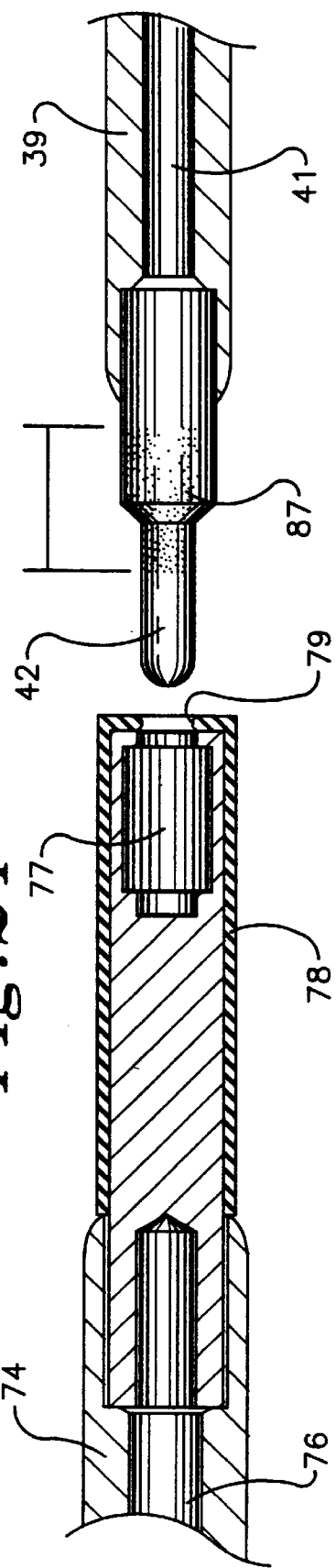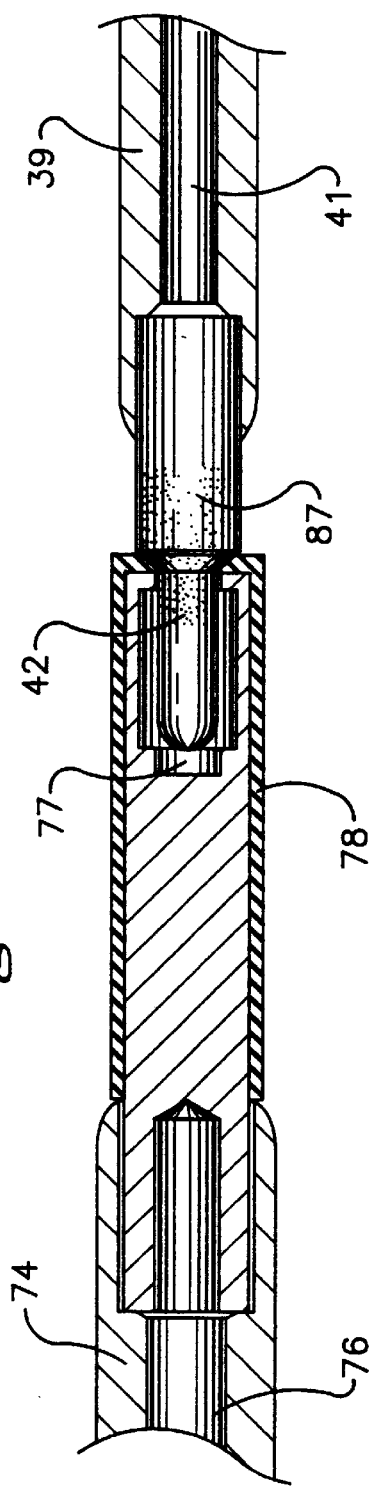

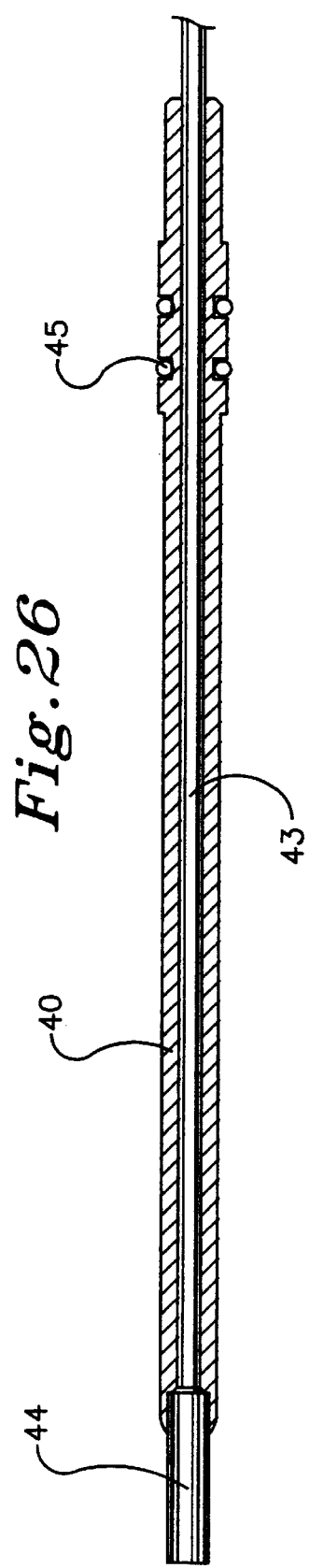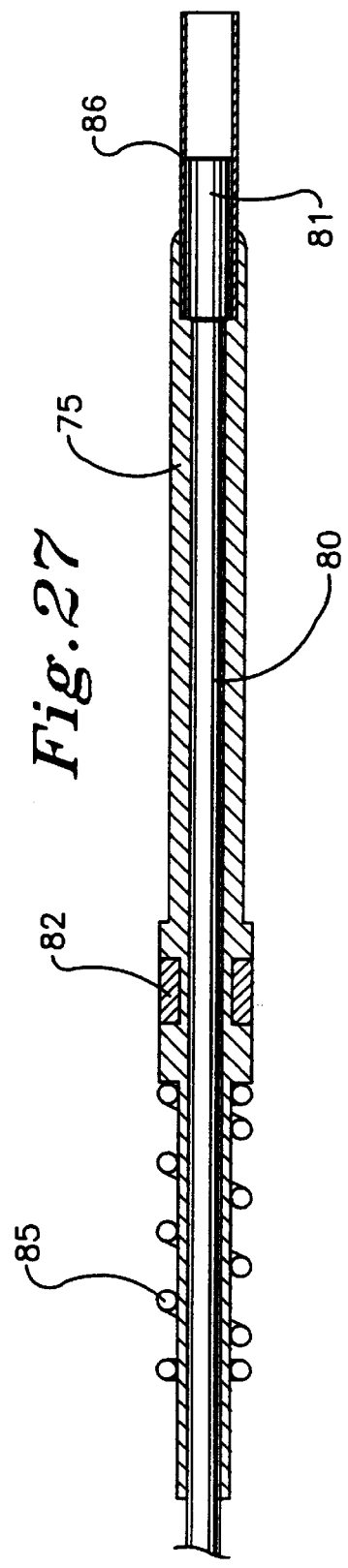

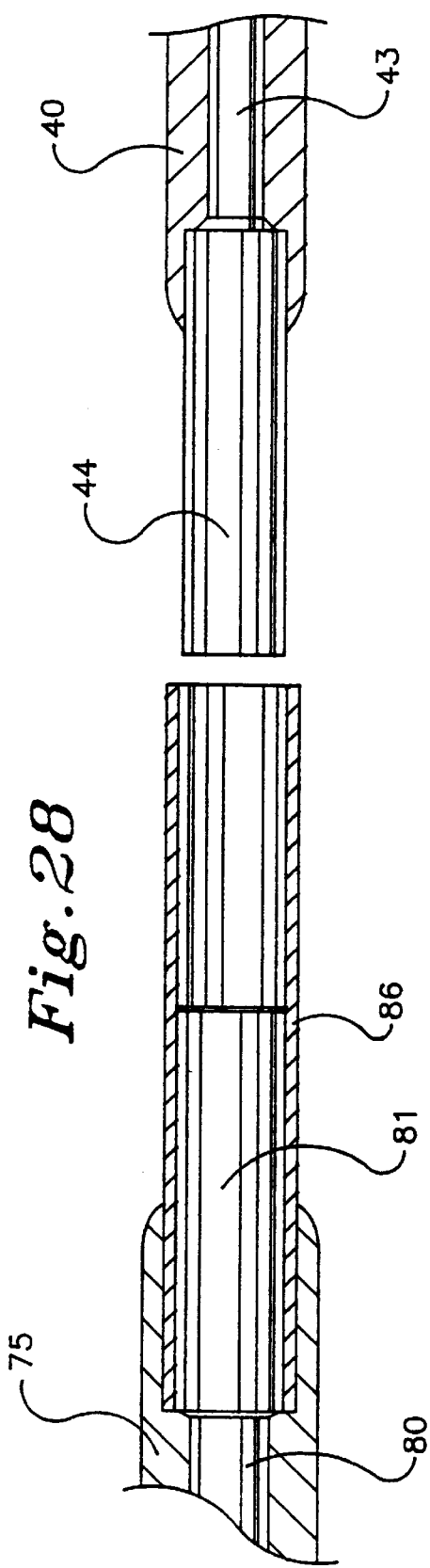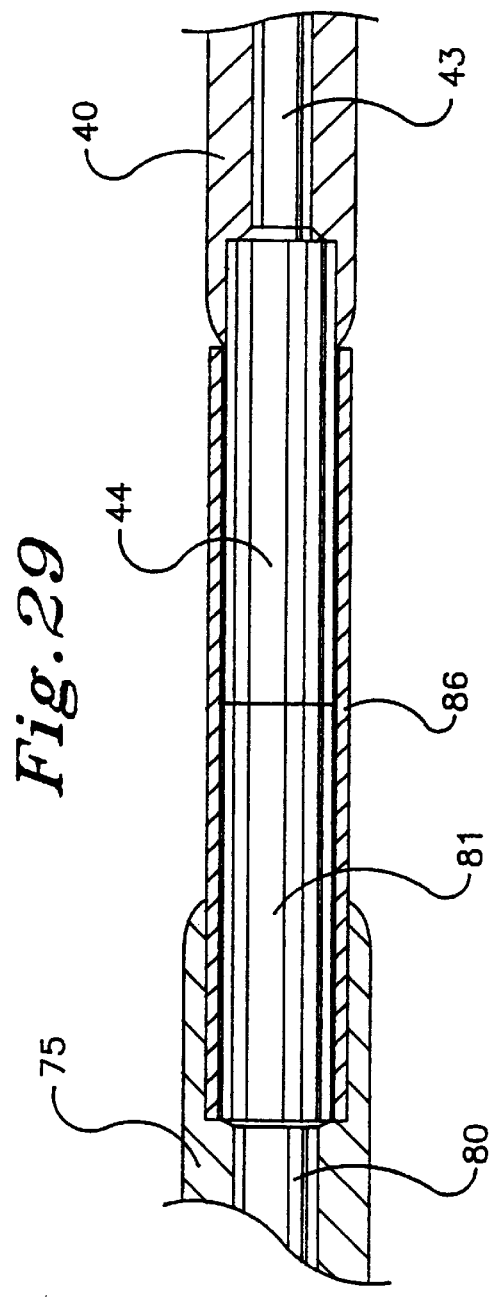

ent. 14, 1998.

UNDERWATER CONNECTOR

CROSS-REFERENCES TO RELATED APPLICATIONS

This application is a Continuation-In-Part of application Ser. No. 08/612,371 of James L. Cairns filed Mar. 7, 1996, now U.S. Pat. No. 5,738,535 issued Apr. 14, 1998.

BACKGROUND OF THE INVENTION

The present invention relates to an underwater pin and socket type connector for making connections of electrical or fiber-optic circuits in harsh environments, such as great ocean depths.

There are many types of connectors for making electrical and fiber-optic cable connections in hostile environments. One type includes connectors for undersea mating and demating. Such underwater connectors typically comprise a plug unit containing one or more contact probes and a receptacle unit containing an equivalent number of receptacle contacts or junctions for engagement with the contact probes, which extend into the receptacle unit when the units are connected together. Typically, the contacts or junctions are contained in a sealed chamber containing dielectric fluid, and the probes enter the chamber via one or more normally sealed openings. One major problem in designing such units is the provision of seals which will adequately exclude seawater from the contact chamber even after repeated mating and demating, and also prevent dielectric fluid from leaking out of the chamber.

A number of different sealing mechanisms have been proposed in the past for achieving this objective. One such sealing mechanism has an opening into the contact chamber which comprises an elastomeric tubular entrance surrounded by an elastomeric sphincter which pinches the entrance closed upon itself when the plug and receptacle units are in an unmated condition. In the mated condition, the sphincter pinches against the entering probe to form a seal. Although this type of seal is successful in some cases, it does have disadvantages. One disadvantage is that this seal does not work well under all hostile conditions. Another disadvantage is that such seals tend to lose their "memory" after repeated mating and demating, so that they may fail to close completely, or may not close quickly enough to isolate the chamber from the surrounding environment when the units are demated. Another type of known seal mechanism comprises a piston which moves axially into the seal opening as the units are demated.

In some known underwater electrical connectors, such as that described in my U.S. Pat. Nos. 4,795,359 and 5,194,012, tubular socket contacts are provided in the receptacle unit, and spring-biased pistons are urged into sealing engagement with the open ends of the socket assemblies. As the plug and receptacle units are mated, pins on the plug portion urge the pistons back past the contact bands in the sockets, so that electrical contact is made. However, this type of arrangement cannot be used in an optical connector since the optical contacts must be able to engage axially for practical purposes.

Underwater electro-optical connectors are described in U.S. Pat. Nos. 4,616,900 and 4,666,242 of Cairns. In U.S. Pat. No. 4,666,242, the male and female connector units are both oil filled and pressure balanced. This device utilizes a penetrable seal element having an opening which pinches closed when the units are separated. Other known fiber-optic connectors have similar seals which are not suitable for use under some conditions and may tend to lose effectiveness after repeated mating and demating.

Known seal mechanisms are not completely effective in providing repeatable, reliable optical and electrical connections in adverse environments while maintaining electrical or optical contacts or terminals in isolated chambers at all times. Optical connectors which are currently available are extremely expensive and generally require complicated means for terminating the connector elements or junctions to the cables they are intended to connect. Up to now, none of the known connectors have been ideal for making repeated and reliable optical and electrical connections in hostile environments such as the greatest ocean depths.

SUMMARY OF THE INVENTION

It is an object of the present invention to provide a new and improved connector for making connections between optical fiber cables, electrical cables, or electro-optical cables in hostile environments, such as underwater.

According to the present invention, a connector assembly is provided which comprises a mateable plug unit and receptacle unit, the receptacle unit having a first end and a second, mating end, at least one bore extending inwardly from the mating end of the receptacle unit and having an enlarged, recessed seat at the mating end, a receptacle contact element mounted in the bore, a seal member movably mounted in the seat portion, the seal member having a through bore and being movable in a non-axial direction relative to the axis of the receptacle unit between a first, closed position in which the through bore is offset from the receptacle bore and the end of the receptacle bore is sealed, and a second, open position in which the seal through bore is aligned with the receptacle bore, the plug unit having a first end and a second, mating end for engagement with the second end of the receptacle unit, the second end of the plug unit having at least one opening aligned with the bore in the receptacle unit and a contact element slidably mounted in the plug unit for projecting out of the opening and through the seal member bore into the receptacle unit bore to contact the receptacle contact element when the seal member is in the open position, and at least one actuator rod is secured in one of the units for projecting through an aligned bore in the other unit when the units are mated together, the actuator rod having an actuator for moving the seal member back and forth between the first and second positions.

Preferably, the plug unit has an identical recessed seat at its mating end at the plug contact element opening and a matching seal member movably mounted in the seat, the seal member having a through bore and being movable between a closed position in which the through bore is offset from a plug bore in which the contact element is mounted, and an open position in which the through bore is aligned with the plug bore.

In a preferred embodiment of the invention, each recessed seat has a surface which is at least partially curved, and the seal member has a matching curved outer surface and is rotatably mounted in the seat for rotation between the closed and open positions. The seal member may be disc-shaped or spherical, but in the preferred embodiment each seal member is cylindrical and the mating seats are of part-cylindrical shape. Each cylindrical seal member is rotatably mounted in the respective seat for rotation about its longitudinal axis, and the through bore extends transversely through the longitudinal axis. Thus, the seal members roll from the closed to the open position as the units are connected together. The seal members are preferably of slightly larger dimensions than the cylindrical dimensions of the seat, so that they are compressed slightly to form a better seal.

Each seal member preferably has a radially projecting tab, and at least two actuators are provided for engaging the tabs of the respective seal members to open and close them as the units are mated and de-mated, respectively. Thus, each seal member is positively actuated to roll from the closed to the open position, and back from the open to the closed position. This provides a more reliable, positive engagement between each actuator and seal member.

Preferably, the receptacle unit has a series of parallel bores each containing a contact element in a receptacle body, and each of the bores terminates in the same recessed area in a front face of the body. The seal member has a series of transverse, parallel through bores extending across its diameter at spacings matching the spacing between the receptacle unit bores. The seal member is rotatably retained in the recess so that a portion of the seal projects outwardly through the outwardly facing opening. One or more such seal members may be rotatably mounted in matching recesses in the front face of the receptacle and plug units, depending on the number of contacts to be made in the connection.

The plug unit preferably comprises a hollow outer shell with a fixed rear end and a plug manifold slidably mounted in the shell. The or each contact element extends slidably through an aligned bore in the plug manifold and is fixed in the rear end of the shell, such that when the manifold is urged inwardly into the shell, the contact element projects outwardly through the forward end of the manifold and into the receptacle unit for contact with the corresponding receptacle contact element.

In a preferred embodiment, both the plug and receptacle unit have an internal chamber communicating with the or each contact element bore which is filled with a benign fluid such as an optically clear dielectric fluid or oil. Preferably, each of the seal members has at least one bleed port extending from one side of the member transversely into the seal through bore, and the bleed port is aligned with the respective bore in the receptacle or plug unit when the seal member is in the closed position, allowing the through bore to be filled with fluid. Where each seal member has a series of through bores, a corresponding number of bleed ports is provided so that each through bore is filled with fluid in the closed position of the seal member.

Due to the fact that each rolling seal member has an elastomeric portion which preferably projects partially out of the front or mating face of the respective connector unit, a very effective seal will be made when the two end faces are pushed together. This acts to compress the projecting seal portions, forcing any moisture away from the seals. Additionally, as the seal members are rolled between the closed position and the open position, which occurs automatically as the two units are mated, any debris is also rolled out of the region between the seals. Finally, since the seal through bores are already filled with fluid as they arrive at the open position, moisture is effectively excluded as the junction is made. This produces a double-acting seal which is extremely reliable and easy to actuate over repeated mating and demating, and which is particularly useful in an underwater optical or electrical connector.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 3 is an end elevational view of a mating end face of the receptacle unit;

FIG. 4 is an end elevational view of the corresponding mating end face of the plug unit;

FIG. 5 is a perspective view of one of the rolling seals used in the end faces of the plug and receptacle units;

FIG. 6 is a section on the lines 6—6 of FIG. 5;

FIG. 7 is a section on the lines 7—7 of FIG. 6;

FIG. 8 is a section on the lines 8—8 of FIG. 7, showing only the rigid core of the seal without the outer elastomeric member;

FIG. 9 is a side elevational view of the plug manifold block, partially broken away, prior to insertion of the rolling seals;

FIG. 10 is a section on the lines 10—10 of FIG. 9;

FIG. 11 is a partial section on the lines 11—11 of FIG. 9, illustrating a first step in installation of one of the rolling seals;

FIG. 12 is a section similar to FIG. 11 but showing the rolling seal installed in the cavity and secured with the end sector of the block;

FIGS. 15A–J are partial side elevational views of the plug unit rolling seals and actuator rods at successive positions as the seals are rolled back and forth between a fully closed position and a fully open position;

FIG. 16 is a side elevation view of the double-acting actuator rod for controlling operation of the receptacle unit seals;

FIG. 17 is a top plan view of the actuator rod of FIG. 16;

FIG. 18 is an end view of the actuator rod of FIG. 16;

FIG. 19 is a side elevational view of one of the actuator rods for controlling operation of one of the plug unit seals;

FIG. 20 is a side elevational view of the opposing actuator rod for controlling operation of the other plug unit seals;

FIG. 21 is an end view of the actuator rod of FIG. 19;

FIG. 22 is a longitudinal cross-section through an electrical contact pin and housing;

FIG. 23 is a longitudinal cross-section through an electrical socket and housing;

FIG. 24 is an enlarged partial sectional view of the electrical pin and socket prior to connection;

FIG. 25 is a similar view to FIG. 24 showing the pin and socket in the fully mated condition;

FIG. 26 is a longitudinal section through an optical contact housing of the plug unit;

FIG. 27 is a longitudinal cross-section through an optical contact housing of the receptacle unit;

FIG. 28 is an enlarged, partial sectional view of a pair of optical contacts prior to connection;

FIG. 29 is a view similar to FIG. 28 illustrating the contacts in the fully mated condition;

DESCRIPTION OF THE PREFERRED EMBODIMENT

The drawings illustrate a two part underwater connector for connecting optical, electrical, or electrooptical cables. In the illustrated embodiment, the connector is a hybrid electro-optical connector designed for making electrical and fiber-optic connections. However, it will be understood that the same connector may be modified for making only fiber-optic connections, or only connections in an equivalent fashion. Additionally, an eight-way fiber-optic connector is illustrated by way of example only, and it will be understood that the connector may alternatively be designed for making a greater or lesser number of connections, depending on the application. The connector may be used for making connections in any harsh environment, not only underwater or at great ocean depths, although it is particularly intended for use in underwater applications.

Figure 1:
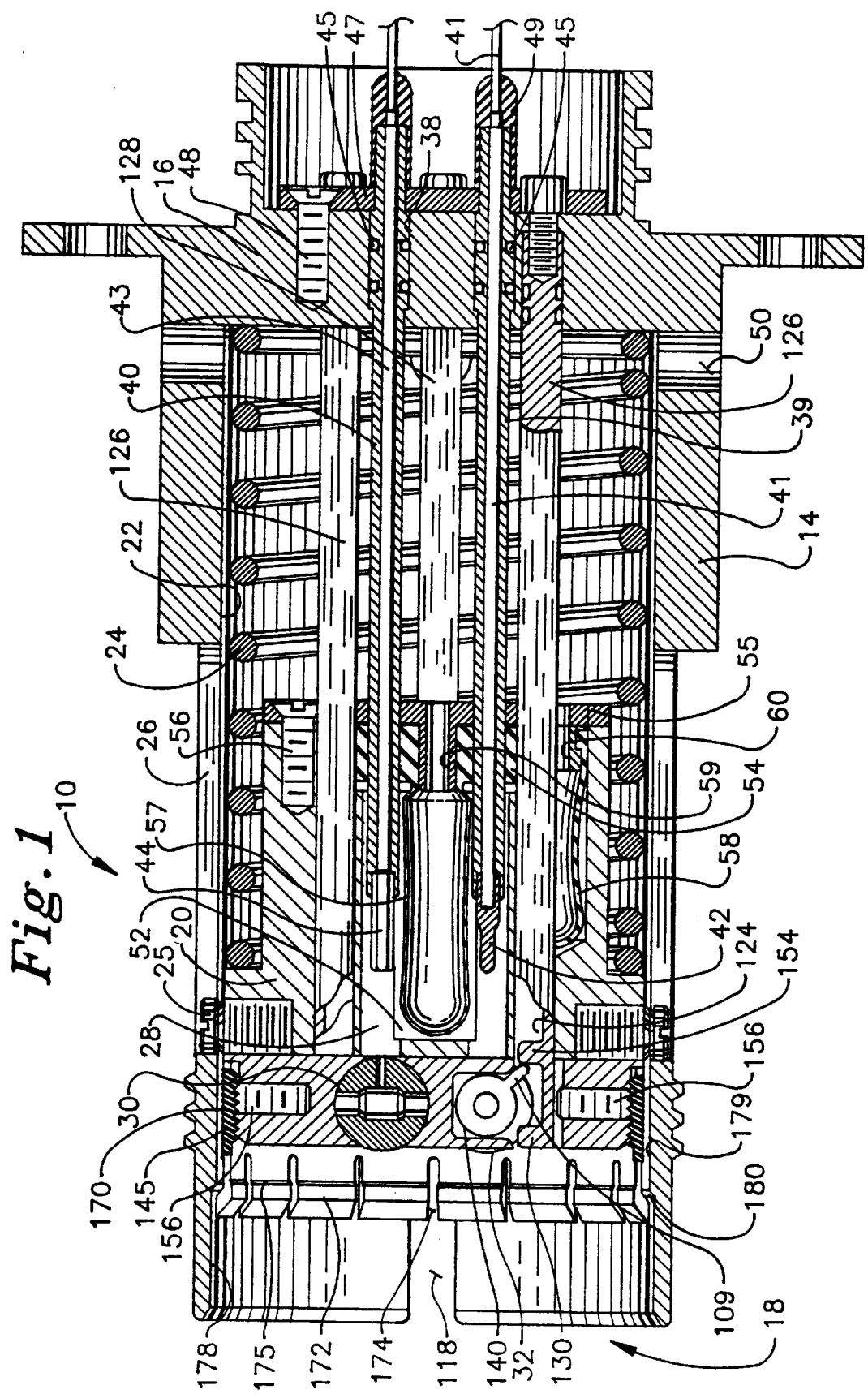
FIG. 1 is a longitudinal sectional view of a plug unit of a connector according to a preferred embodiment of the invention.
Figure 2:
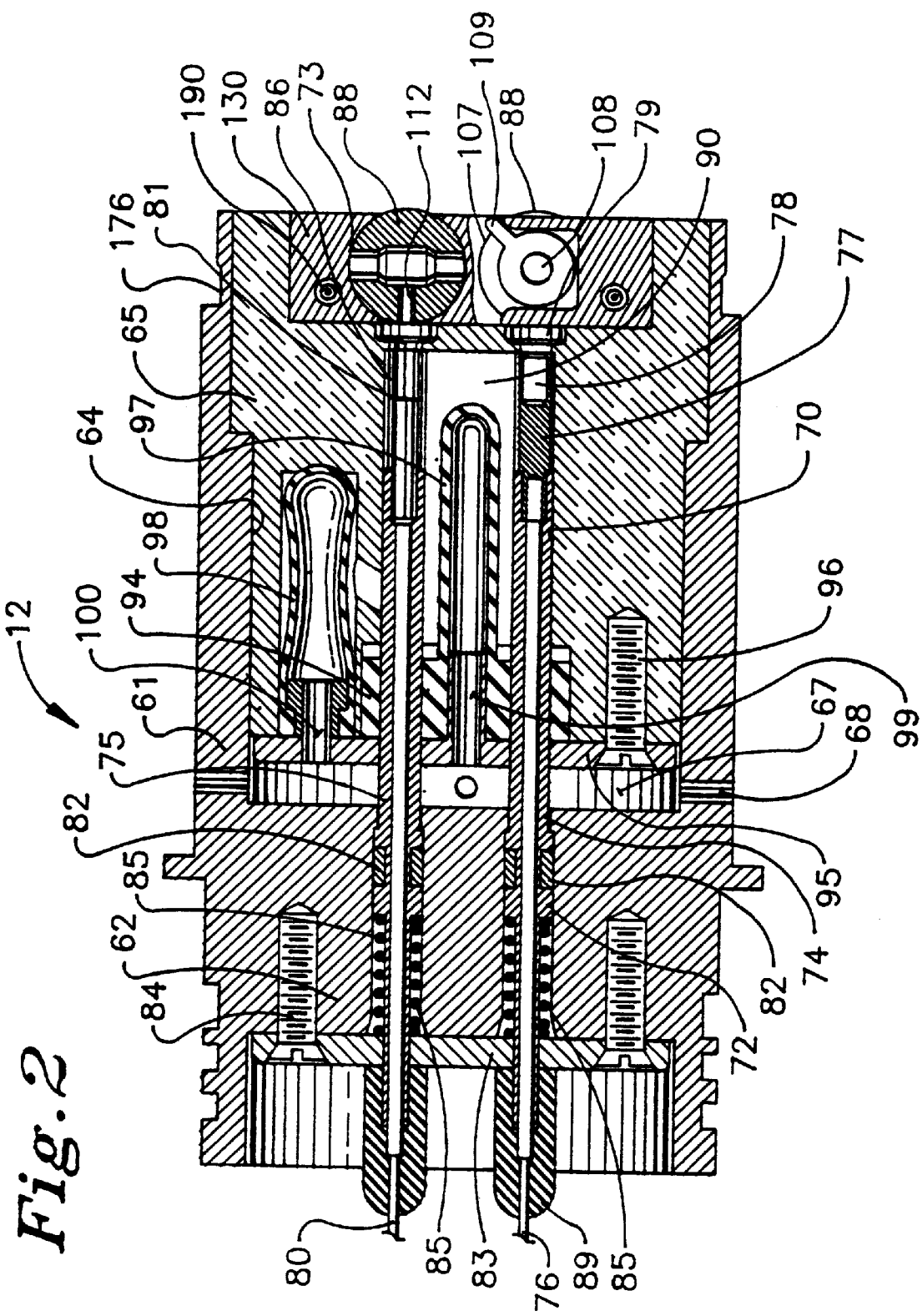
FIG. 2 is a longitudinal sectional view of a receptacle unit for mating engagement with the plug unit.
Figure 33:
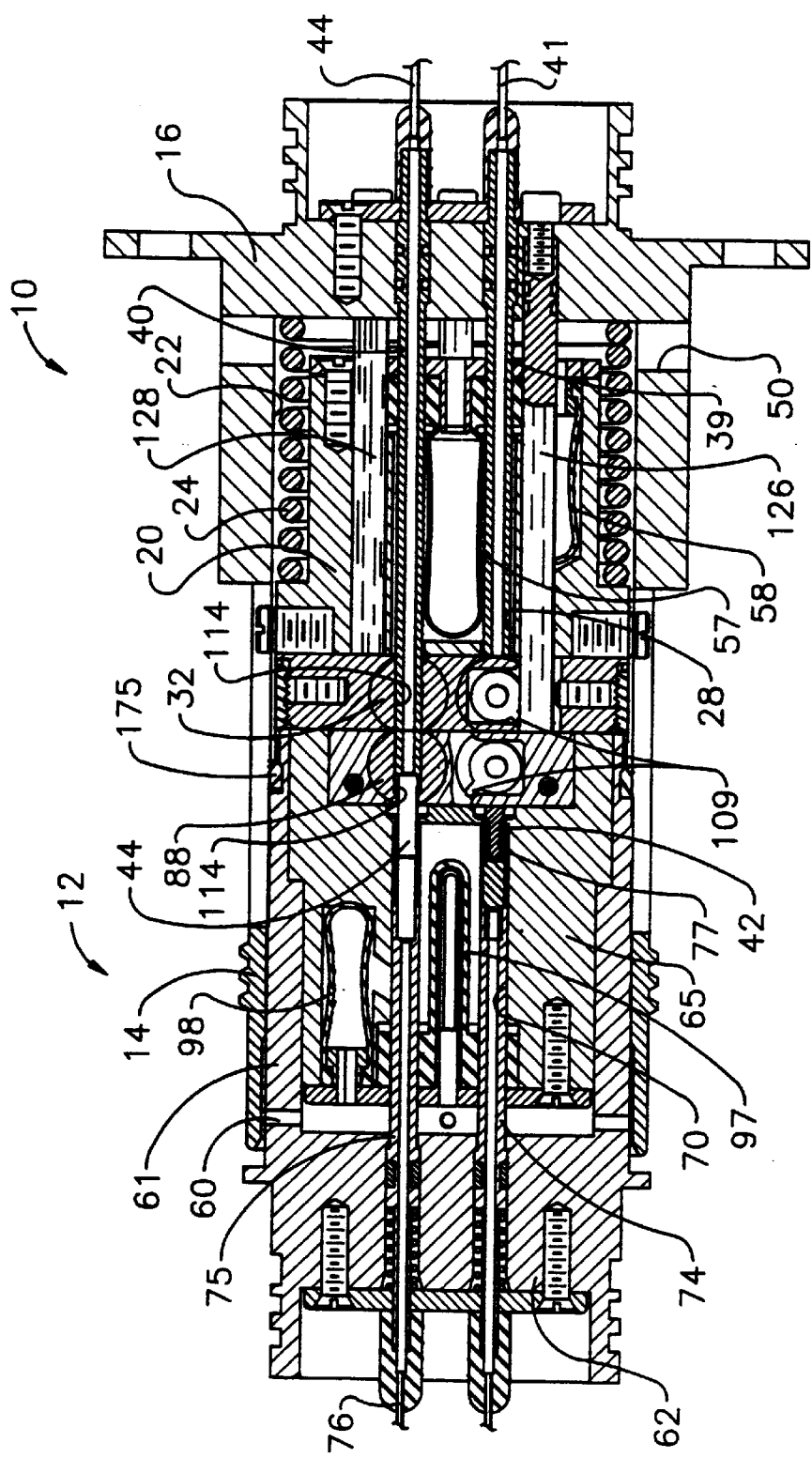
FIG. 33 is a view similar to FIGS. 30–32 but illustrating the two units fully engaged and connected.

The connector comprises a plug unit 10 as illustrated in FIG. 1 and a receptacle unit 12 as illustrated in FIG. 2 which interconnect to form an integral cylindrical connector as illustrated in FIG. 33. The plug unit 10 comprises an outer cylindrical shell 14 of rigid material having a sealed rear end wall 16 and an open forward end 18. A plug contact manifold 20 of rigid material is slidably mounted in plug chamber 22 and is biased by biasing spring 24 into the forward position illustrated in FIG. 1. Key pins 25 projecting outwardly from manifold 20 extend into axially extending keyways or slots 26 on the inner wall of shell 14 to prevent rotation of manifold 20 while allowing it to move axially.

The plug manifold has a series of parallel through bores 28 extending from the rear end to the forward end of the manifold. The number of bores depends on the number of connections to be made, which in this case is eight. Four of the bores will be located in the upper half of the manifold as illustrated in FIG. 1, and the other four will be located in the lower half of the manifold. The bores terminate in a pair of parallel, part-cylindrical recesses 30 located in the front face of the manifold, with the four upper bores terminating in one recess and the four lower bores terminating in the other recess. A pair of rolling seal devices 32 are rotatably mounted in the respective recesses 30.

A series of through bores 38 in the shell end wall 16 are each aligned with a respective one of the manifold through bores 28. A series of electrical lead housings 39 and optical fiber housings 40 project through respective aligned bores 38,28. The drawings illustrate one of the electrical lead housings 39 and one of the optical fiber housings 40. The electrical contact pin and housing is illustrated in more detail in FIG. 22. An electrical lead 41 projects through each of the electrical housings 39 and terminates in electrical contact pin 42. Optical fibers 43 pass through the bores of optical fiber housings 40 and terminate to alignment ferrules 44 which are secured in seats at the end of the respective tubular housing 40. Connection of the fiber 43 to the alignment ferrule is made using standard epoxy and polish techniques. When assembled, the epoxy is allowed to fill the bore of tubular housing in such a way as to render the assembly without voids so that the assembly housed by the tubular housing forms a pressure barrier.

The rear end of the plug shell is suitably threaded or provided with other securing devices for connecting it to the end of a coaxial electro-optical cable carrying electrical leads and optical fibers which are suitably connected to leads 41 and fibers 43. Each of the housings 39 and 40 is sealed via O-ring seals 45 to the respective bore 38 in the end wall 16. A backing plate 47 is secured over the rear end wall and housings 39 and 40 via mounting screws 48, and the assembly forms an impermeable high pressure barrier at the terminal end of the plug unit. A rubber strain relief member or boot 49 is secured over the projecting end of each housing 39, 40 and port of the electrical or optical lead on the outside of plate 47.

Chamber 22 communicates with the external environment via vent ports 50. Plug manifold 20 has a central internal chamber 52 which communicates with each of the bores 28, and the rear end of the chamber is sealed via an elastomeric barrier or seal member 54. The elastomeric barrier has openings through which the respective tubular housings 39,40 project, and acts as a Morrison seal around the housings. Seal member 54 is held in place via backing plate 55 which is secured to the inner end of the manifold via screws 56. Two flexible bladders 57,58 project from seal member 54 into the internal chamber 52 of manifold 20, and communicate with the main chamber 22 via ports 59,60 through the member 54 and plate 55. The portions of chamber 52 on the outside of bladders 57,58 are filled with a dielectric, optically clear fluid, while the interior of the bladders will be filled with seawater from chamber 22.

Dielectric fluid will therefore fill the forward end of each of the bores 28. Member 54 provides pressure compensation between the pressure of fluid inside and outside the seal unit by flexing inwardly or outwardly as appropriate.

The mating receptacle unit 12 also has a rigid outer shell 61 having a terminal or rear end wall 62 and a cylindrical bore 64 projecting inwardly from the forward end. A receptacle manifold block 65 of rigid material is secured in the bore 64 in shell 61 via suitable retaining screws (not illustrated), leaving a chamber 67 between the rear end of block 65 and the end wall 62, which communicates with the exterior of the unit via vent port 68. A series of through bores 70 extend through the manifold block 65, terminating in a pair of part-cylindrical seats or recesses 73 at the forward end of block 65. Rolling seal devices 88 are rotatably mounted in each of the seats 73 to seal the open forward ends of bores 70 in the closed position illustrated in FIG. 2. The number of through bores corresponds to the number of connections to be made, as discussed above, and in this case four parallel bores are provided in the upper half of the manifold as viewed in FIG. 2, and four bores in the lower half, as best illustrated in FIG. 4. Aligned through bores 72 are provided in rear end wall 62, and electrical and optical tubular housings 74,75 project through bores 72 and into aligned bores 70, as illustrated in FIG. 2.

An electrical lead 76 passes through the bore of each tubular housing 74, and terminates in an electrical socket 77. A sleeve 78 of compliant material such as rubber is mounted over the body of socket 77. As best illustrated in FIG. 24, sleeve 78 has an inwardly projecting annular lip 79 for sealing around the corresponding contact pin in the plug member when the parts are secured together.

FIGS. 24 and 25 illustrate the electrical pin and socket connection in more detail. The pin 42 has a coating 87 of dielectric material, and the lip 79 engages and seals around the dielectric on the pin as it enters and engages into socket 77.

Optical fibers 80 pass through the bores of tubular housings 75 and terminate to alignment ferrules 81 which are secured in seats at the end of the respective tubular housings 75. Connections of the fiber to the alignment ferrules are made using standard epoxy and polish techniques. When assembled, the epoxy is allowed to fill the bore of tubular housings 75 in such a way as to render the assembly without voids so that the assembly housed by the tubular housing forms a pressure barrier. The rear end of the receptacle shell is suitably threaded or provided with other securing devices for connecting it to the end of a coaxial optical cable carrying optical fibers which are suitably connected to fibers 80. Annular Morrison seals 82 are provided between each housing 74,75 and the rear end wall bore 72 to seal the end wall. The operation of a Morrison seal is described in more detail in our co-pending application Ser. No. 08/856,927 filed May 15, 1997, the contents of which are incorporated herein by reference.

A backing plate 83 is secured over the rear end wall and housings 74,75 via mounting screws 84, and the assembly forms an impermeable high pressure barrier at the terminal end of receptacle unit. Springs 85 installed in counterbored portions of bores 72 are held in place by the backing plate 83, and bias the electrical sockets and optical ferrules outwardly. Contact alignment sleeves 86 are mounted in the forward ends of the bores 70 carrying optical fibers and ferrules. Rubber strain relief members or boots 89 are sealed over projecting portions ends of the electrical and optical leads outside backing plate 83.

The manifold block 65 has a central, internal chamber 90. A flexible compensator seal 94 is secured across the rear end wall of the chamber 90 via backing plate 95 secured across the inner end of block 65 via screws 96. Seal 94 acts as a Morrison seal around each of the tubular housings 74 and 75. Two flexible bladders 97,98 project from seal 94 into chamber 90. The interior of each bladder communicates with chamber 67 via passageways 99,100 through plate 95. The portions of chamber 90 outside bladders 97,98 are filled with a dielectric optically clear fluid.

The structure and assembly of the rolling seals 32,88 into the plug and receptacle manifold blocks 20,65 will now be described in more detail with reference to FIGS. 5–12. It will be understood that the rolling seals 32,88 are installed in the plug and receptacle manifold blocks 20,65 in an equivalent manner. The rolling seals 32 and 88 are of the same structure, and like reference numerals have been used for like parts as appropriate.

As best illustrated in FIGS. 5–8, each rolling seal 32,88 comprises a rigid core 101 over which an elastomeric roller or sleeve 102 is molded or otherwise affixed. The rigid core, which is of metal or hard plastic, has a flattened central segment 104 over which sleeve 102 is molded, and first and second projecting end portions 105,106 projecting from opposite ends of sleeve 102. End portion 106 has a first, larger diameter portion 107 and a smaller diameter end portion 108. A radial tab or tooth 109 projects from the first portion 107. The flattened central segment 104 has through holes 110 passing transversely through it and transverse bleed holes 112 penetrate the through holes 110 from one side of the flattened segment, as best illustrated in FIGS. 7 and 8. The elastomeric sleeve 102 has through bores 114 which are aligned with holes 110 as illustrated in FIG. 6, and which are of slightly smaller diameter than holes 110. As illustrated in FIG. 7, the elastomeric sleeve also has bleed holes 116 extending perpendicular to bores 114 and aligned with bleed holes 112 in the solid core. Holes 116 extend from one side of the sleeve 102 and terminate at the junction with holes 112, unlike bores 114 which extend through the entire sleeve. The opposite end portion 105 of the solid core comprises a reduced diameter shaft or rotation axle for the seal.

FIGS. 3 and 4 illustrate the mating end faces of the plug and receptacle units, respectively, with the rolling seal ports 114 in the open position for clarity. In a conventional manner, the plug shell has an axial keyway 118 extending from its end face, while the receptacle has an alignment key 119 which engages in the keyway to ensure that the parts are accurately oriented relative to one another on mating. The key and keyway also prevent relative rotation between the ports as they are connected together, as explained in more detail below. Two actuator rod ports 120 of square section project inwardly through the end face of the manifold block 65 on one side of the rolling seal assembly, while a third port 122 of square section extends inwardly on the opposite side of the seal assembly at a location between the two rolling seals. Corresponding passageways 124,125 are provided at equivalent locations on the mating end face of the plug manifold block, such that the passageways 124 are aligned with ports 120 while the passageway 125 is aligned with port 122 when the two ports are connected together. Passageways 124,125 extend through the entire plug manifold body. A pair of actuator rods 126 are fixed in the base or end wall 16 of the plug shell and extend slidably through passageways 124, and are of corresponding square cross-section. A third actuator rod 128 is fixed at one end in end wall 16 and extends slidably through passageway 125 between the rolling seal 32, and is of corresponding square cross-section. The ends of rods 126,128 are flush with the end face of plate 34 when the plug unit is disconnected from the receptacle unit, as illustrated in FIG. 1.

The front end portion 130 of each manifold block is designed for mounting the respective rolling seals in matching recessed areas while the projecting end portions of the rigid core are provided in corresponding recesses or chambers provided in the manifold block for receiving those portions.

FIGS. 9–12 are partially sectioned views of the plug manifold block 20 illustrating installation of the rolling seals 32. It will be understood that the front end of the receptacle manifold block will be of equivalent structure, and like reference numerals have been used for like parts as appropriate. Each of the manifold blocks 20,65 is formed in one piece apart from a cut-out segment 132 in the front end of end portion 130 which has a chord 134 intersecting one end of each of the part-cylindrical recesses 30,72. A corresponding segment-shaped part 136 is designed to fit into the cut-out segment 132 after installation of the rolling seals into the two recesses 30 or 72, as best illustrated in FIGS. 10 and 11. The cylindrical recesses 30,72 each have a slot shaped opening 137,138 respectively, in the end face of the respective manifold block. A counterbore 139 at the inner end of each recess 30,72 is designed to receive the end portion or axle 105 of each rolling seal, and a pair of stepped diameter bores or chambers 140 in the mating end face of part 136 are designed to receive the opposite end portions 106 of each of the rolling seals.

As illustrated in FIG. 10, the square-section passageway 125 through the plug manifold block 20 extends between the counterbores 139, while the square section passageways 124 extend through the block 20 and the part 136 so as to intersect the larger diameter portion of each of the bores 140, so that the actuator rods 126 can engage and actuate the respective rolling seals 32, as described in more detail below in connection with FIGS. 15A–J. The reverse is true in the receptacle manifold block. In this block, the square section passageway 122 will extend through the block and the segment-shaped part 136 so as to intersect the larger diameter portion of each of the bores 140, while the two square section passageways 120 will extend through the block spaced outside each of the counterbores 139. Thus, actuator rod 128 will project into passageway 122 to actuate the two rolling seals 88, as described in more detail below in connection with FIGS. 14A–J.

As noted above, the receptacle manifold block is of similar structure to the plug manifold block, except that the seal members in the plug unit are oriented in the reverse direction to those in the receptacle unit, i.e. at 180° to the seal members 88. This can be seen in the schematic illustration in FIG. 13, where all parts except for the rolling seal members and actuator rods and bores have been eliminated for clarity.

FIGS. 11 and 12 illustrate installation of one of the rolling seals 32 into a recess 20. The recess 30 is of slightly smaller diameter than the elastomeric sleeve 102. The rolling seal 32 is slid into the recess 30 via open end 142 so that the projecting shaft or axle 105 extends into counterbore 139. The end portion 106 will project out of the opposite end of the recess. The segment-shaped part 136 is then inserted into cut-out region 132 such that bores 140 engage over the projecting end portions 106 of the two rolling seals 32, capturing the rolling seals 32 as illustrated in FIG. 12. The part 136 may be secured to the remainder of the manifold block in any suitable manner. In a preferred embodiment of the invention, the outer surface of the block end portion 130 and of the part-cylindrical outer surface of part 136 have matching screw threads 144. A threaded collect sleeve 145 is then screwed over the front end of plug manifold 20 and part 136, securing the parts together. In the receptacle manifold block, the part 136 is held in position by outer shell 61 and by pins or screws 190 (see FIG. 2) which extend transversely from the manifold block into part 136.

Figure 13:
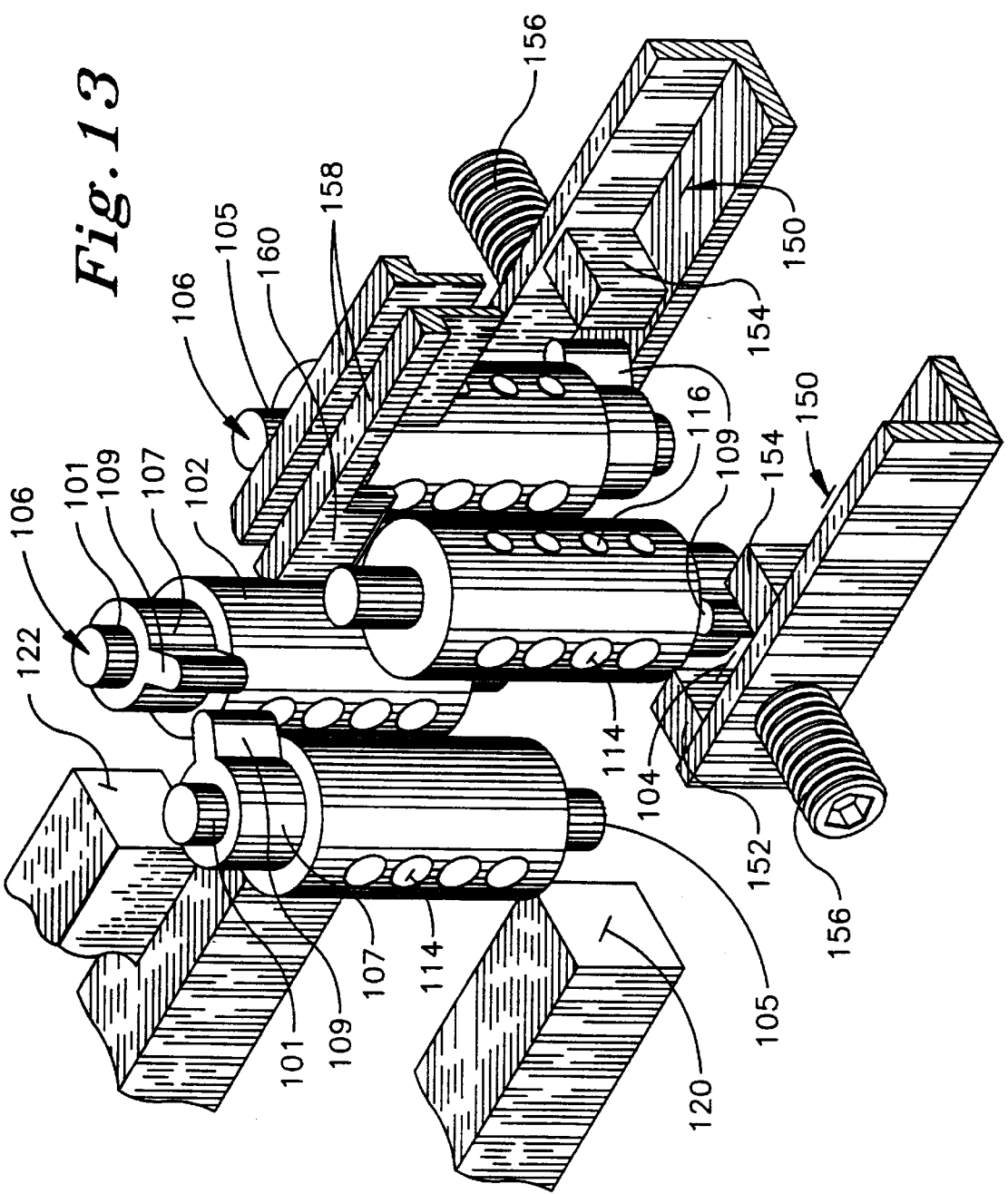
FIG. 13 is a perspective schematic view showing only the rolling seals and actuator rods and passages of the plug and receptacle units as they will be oriented prior to engagement of the seals.
Figure 14:
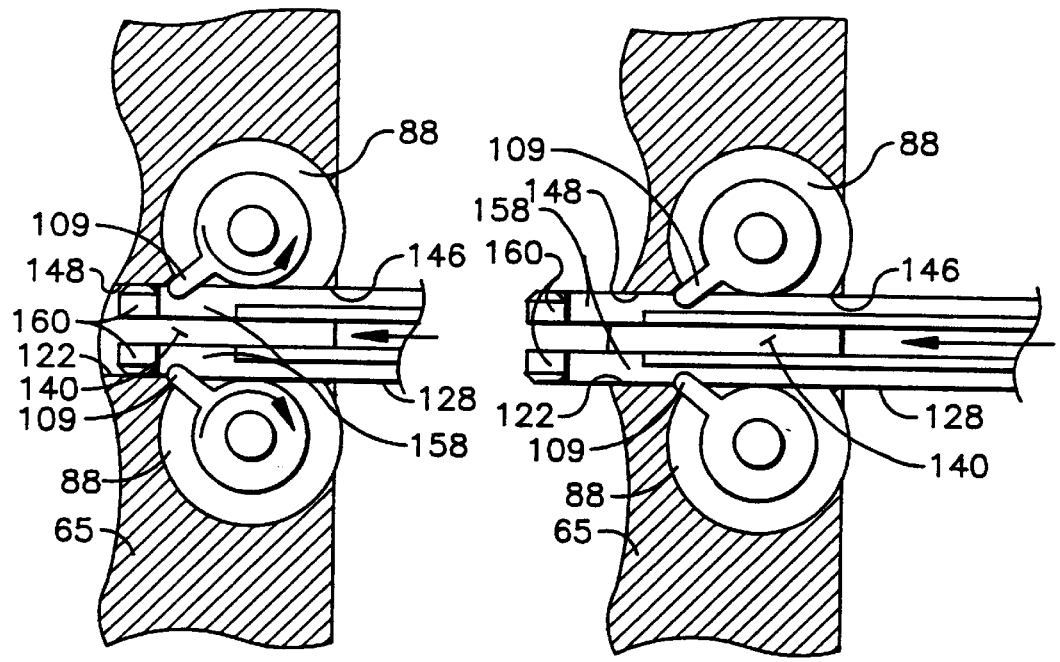
FIGS. 14A–J are partial sectional views of the receptacle unit rolling seals and actuator rods at successive positions as the seals are rolled back and forth between a fully closed and a fully open position.
Figure 14:
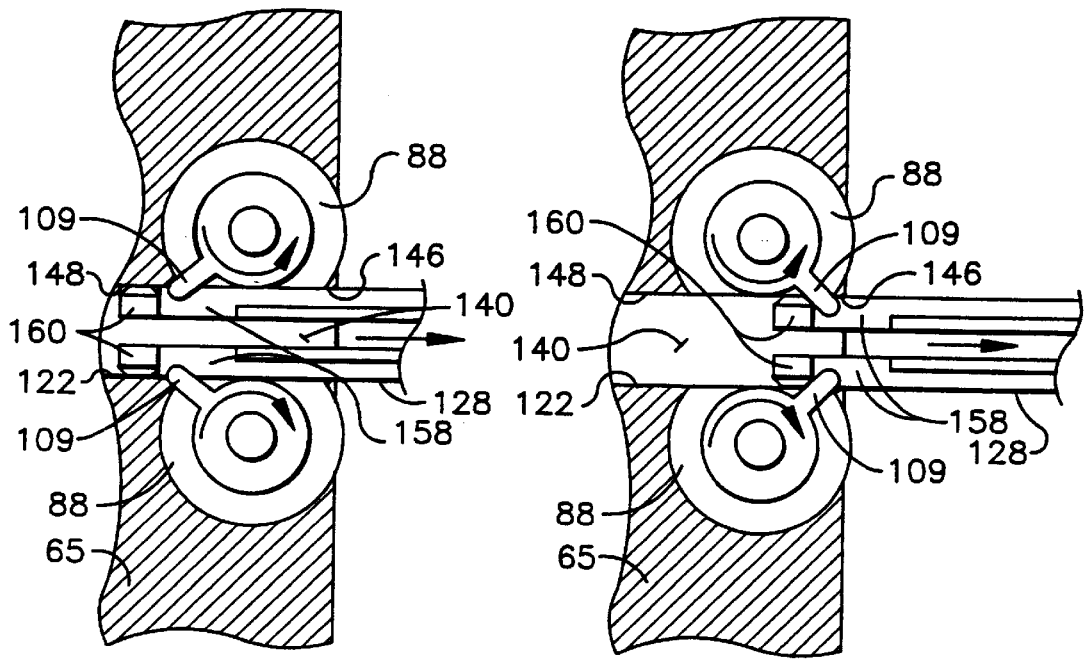

Installation of the rolling seals 88 in the recesses 72 of the receptacle manifold will be identical, except for the fact that they are oriented in the opposite direction to the seals in the receptacle unit, as best illustrated in FIG. 13. Operation of the rolling seal assembly as the plug unit and receptacle unit are connected together can be better understood with reference to FIGS. 13–21. When the units are unconnected, each rolling seal will be in a closed position, as illustrated in FIGS. 13, 14A, 15A and 30. In this position, the through ports 114 extend parallel to the end faces of the units and the bores 28 and 86 carrying the optical fibers and electrical leads are sealed. At the same time, the bleed ports 112,116 connect ports 114 to the respective chambers 52,90 containing dielectric fluid, so that the ports 114 will all be filled with dielectric fluid.

Figures 15A, 15B:
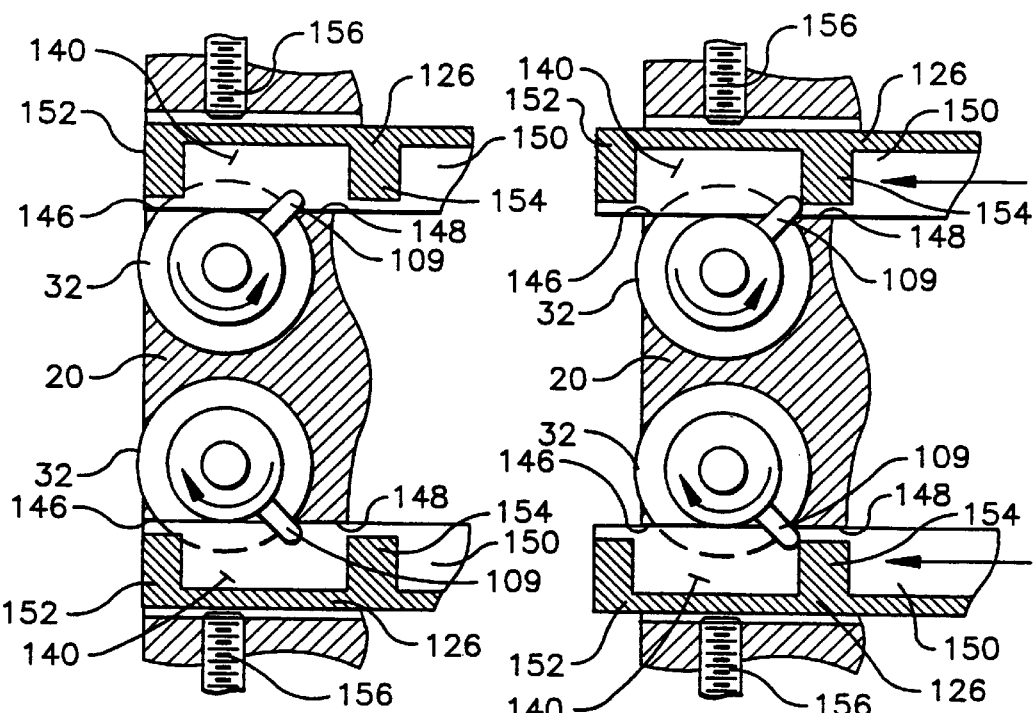
Figure 30:
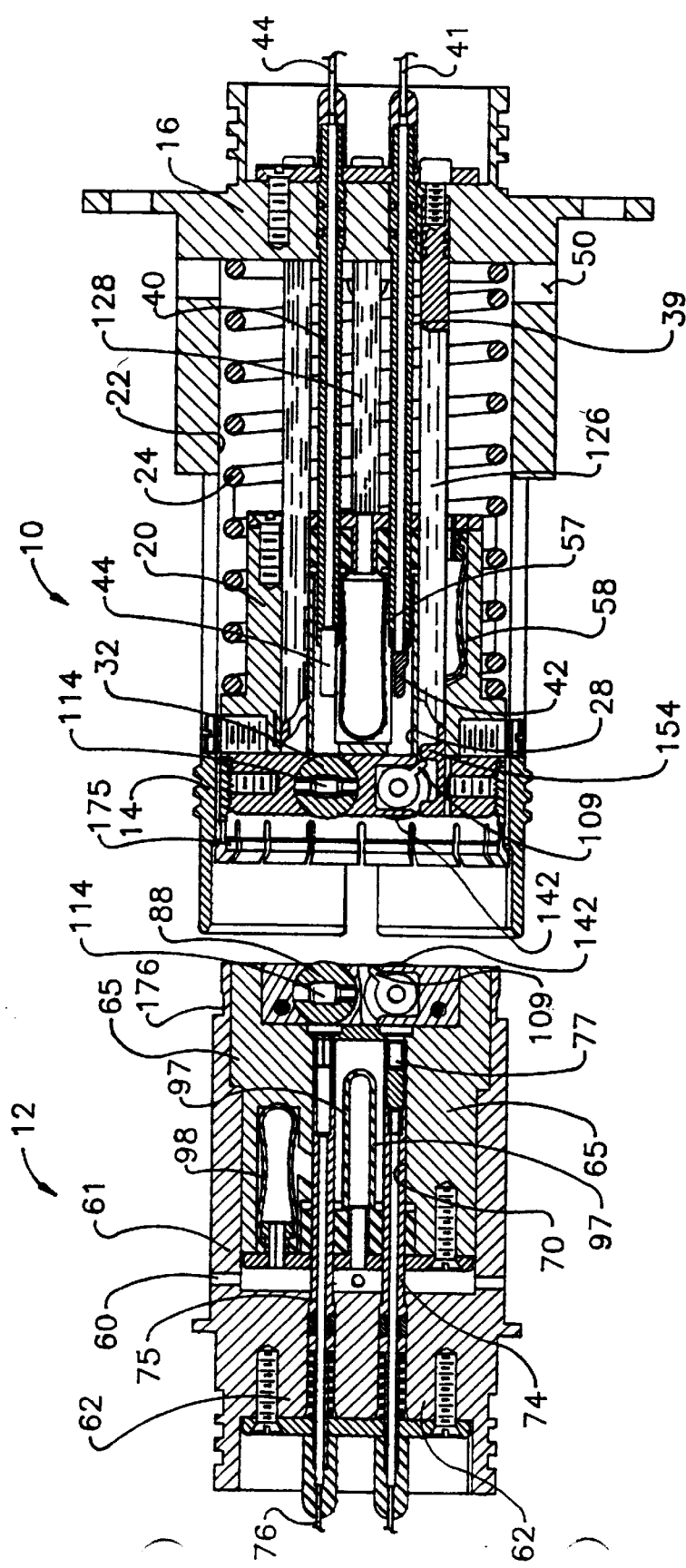
FIG. 30 is a longitudinal sectional view of the plug and receptacle units facing each other as they will be positioned prior to mating.

FIG. 30 illustrates the plug and receptacle units in juxtaposition prior to mating. It can be seen that elastomeric portions 142 project outwardly through the aligned openings or slots 137,138 in the end faces of the plug and receptacle manifolds, respectively. As illustrated in FIGS. 2, 14A, and 30, the end portions 106 of rolling seals 88 in the plug unit which are located in recessed chambers or regions 140 of the receptacle manifold will be positioned with tabs or teeth 109 engaging against a forward end wall 146 of the recessed region 140 when the seals are closed. Similarly, as illustrated in FIGS. 15A and 30, when the plug unit seals 32 are closed, the enlarged end portions 106 of each plug unit rolling seal are also located in an equivalent recessed region or chamber 140, but with the tabs or teeth 109 engaging the rear end wall 148 of chamber 140, which acts as a stop.

The structure of the actuator rods 126 and 128 will first be described in more detail with reference to FIGS. 16 to 21. The pair of rods 126 are identical, and each comprise an elongate rod which is of solid square cross section at its rear end and of generally L-shaped section along the remainder of its length, forming an inwardly facing, elongate recess 150. An end wall 152 at the forward end of each rod is flush with the end face of the plug manifold block when the seals are closed, as illustrated in FIG. 15A. A tab or flange 154 is spaced inwardly from the end wall 152, and is located on the opposite side of the rolling seal, as indicated in FIG. 15A. The two rods 126 are slightly springy, and are mounted in the plug end wall 16 so that the tabs 154 face inwardly towards one another and the rods are flared slightly outwardly. A set screw 156 extends radially inwardly at opposite sides of the manifold block 20 and extends partially into the respective port 124 so that the respective actuator rods are constrained into the orientations illustrated in FIGS. 1 and 15A when the rolling seals are each in the closed position.

The single actuator rod 128 is illustrated in more detail in FIGS. 16 to 18. The rod is of square section at its rear end, and has a forward end with two spaced tines 158 forming a shape similar to that of a tuning fork. The tines 158 will be slightly resilient or "springy". Each tine has a tab or projection 160 at its free end. When the rolling seals in the plug unit are in the closed position as in FIG. 1, each of the actuator rods 126 and 128 will have an end face flush with the forward end face of plug manifold 20, at the end of the respective passageways 124 and 125. Operation of actuator rod 128 to open the two rolling seals 88 in the receptacle assembly will first be described with reference to FIGS. 2, 13 and 14A–J.

Prior to connection of the plug and receptacle units, each of the rolling seals 32 and 88 will be in the closed position of FIGS. 1, 2 and 13, with the ports 114 extending parallel to the manifold end faces. Each rolling seal will project partially outwardly from the respective slot opening 137,138 in the plug and receptacle manifold end face, as best illustrated in FIGS. 1, 2, and 30. As the two units are brought together in the proper relative orientation, the passageway 125 carrying the actuator rod 128 will be aligned with port 122 in the receptacle manifold, while passageways 124 carrying actuator rods 126 will be aligned with the ports 120.

The actuator rods 126 extend through chambers 140 and tabs or flanges 154 engage tabs or teeth 109 on each rolling seal 32, as illustrated in FIG. 15A and also in FIG. 13. The rods 126 do not project out through the end face of the plug manifold block when the plug unit is unmated.

The actuator rod 128 will be aligned with port 122 which communicates with chambers 140 of the receptacle unit. FIG. 14A illustrates the position of rod 128 relative to the end face of the receptacle manifold when the two units are initially brought into face to face engagement.

Figure 31:
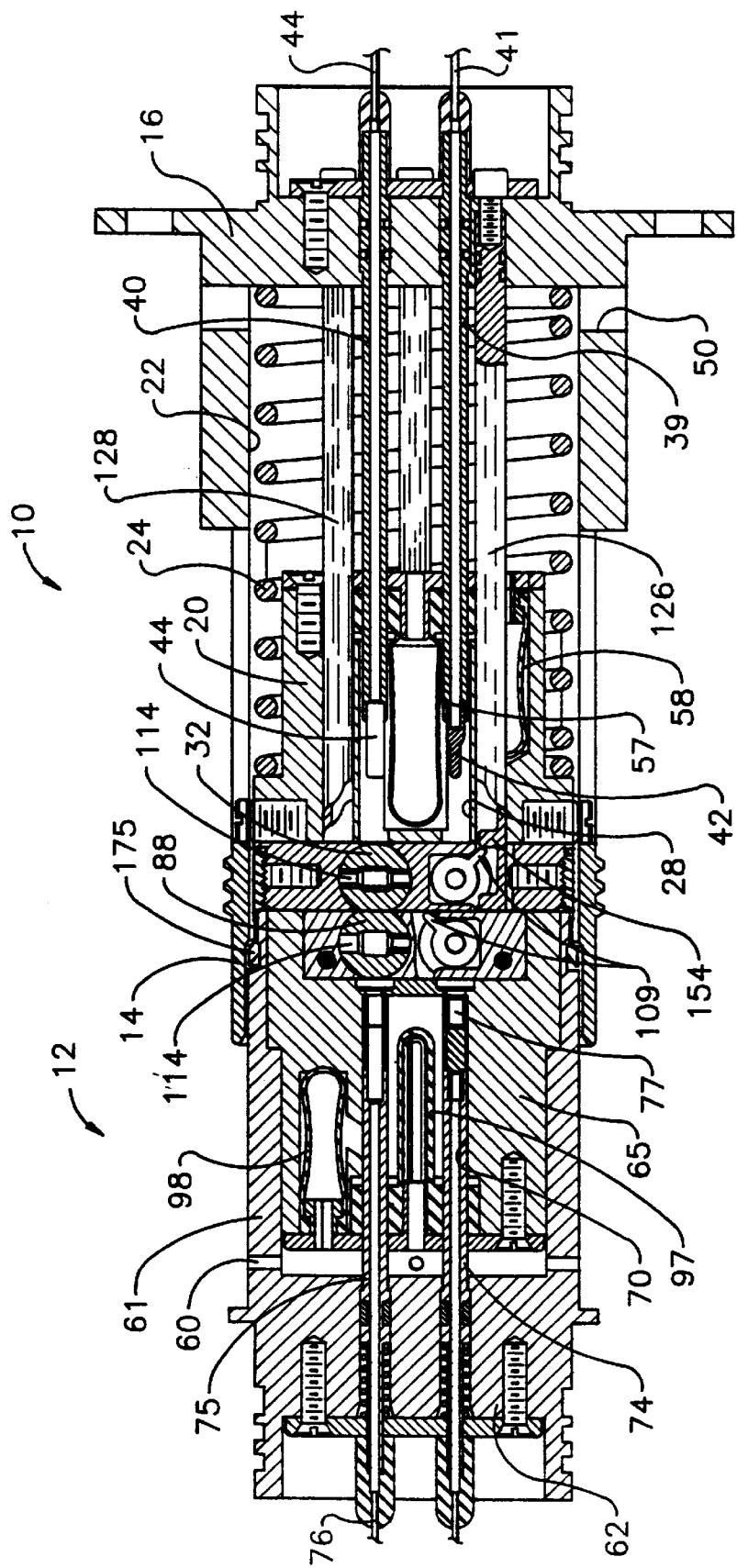
FIG. 31 is a view similar to FIG. 30 illustrating a subsequent stage in the mating procedure in which the two units have just come into engagement.
Figure 32:
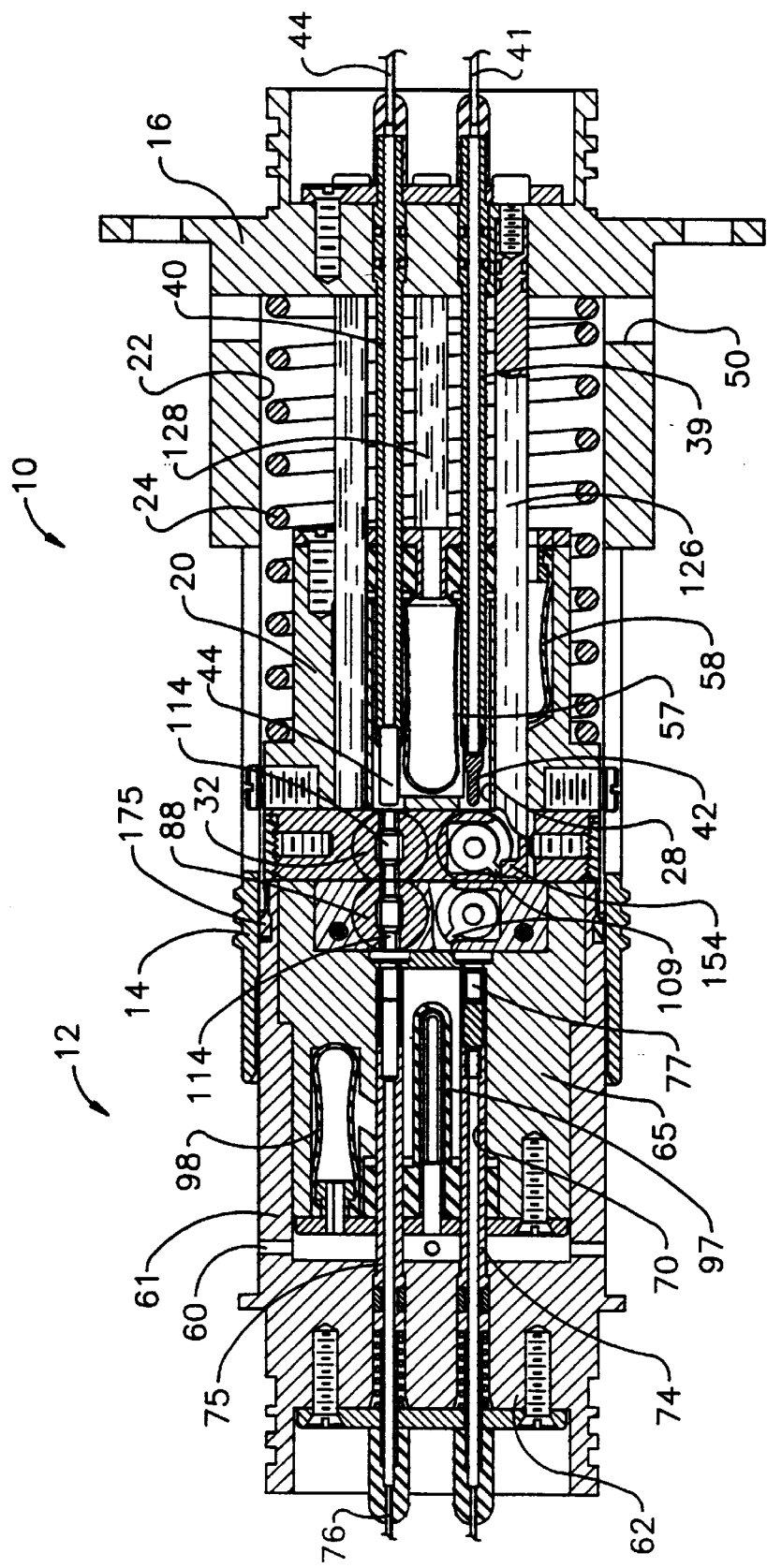
FIG. 32 is a view similar to FIGS. 30 and 31 illustrating a stage in which the seals have been rotated open and the connector is partially engaged.

In FIG. 31, the connector units are pressed together in the first stage of mating operation, in which the projecting portions of the plug and receptacle rolling seals 32,88 are flattened, effectively expelling water from between their opposing faces and sealing the faces of the rolling seals of the plug to those of the receptacle. There may be debris trapped between the opposing seal faces at this point. As the connector units are pushed further together, with key 119 entering keyway 118, spring 24 of the plug unit begins to compress as the plug manifold is urged inwardly. At the same time, the rods 126 and 128 will begin to protrude outwardly through the ports 124 and 125 and will enter the aligned ports 120 and 122. Thus, as the receptacle continues into the plug unit shell, it will be impaled by the rods 126 and 128, as illustrated for rod 128 in FIGS. 14A–F. As rod 128 enters port 122, the two projections 160 will contact the respective rolling seal tabs or teeth 109, which protrude partially into port 122 as illustrated in FIG. 14B. FIG. 14C shows partial penetration of the actuator rod 128 into port 122. As the rod 128 continues inwardly in the direction of the arrow, the engagement of projections 160 with tabs 109 will roll the two rolling seals about their longitudinal axes in the directions of the arrows, as illustrated in FIG. 14C. FIG. 14D illustrates the final position in which the tabs 109 of each end portion 105 have engaged the inner surface of recess or chamber 140, preventing any further rotation. In this position, the rolling seals have rotated through 90° so that through bores 114,110 are aligned with bores 72, as also illustrated in FIG. 32. Thus, the tabs 109 permit the rolling seals 88 to rotate between a closed position in which the pins 109 abut the forward end of recessed region 140, as in FIG. 14A, and an open position in which the pins 109 abut the inner end wall, as in FIG. 14D.

The actuator rod 128 will continue on into port 122 after the rolling seals are fully open, as illustrated in FIGS. 14D, E and F. The tines 158 are compressed inwardly to clear tabs 109, as indicated in FIG. 14D and, once past the tabs 109, spring apart again as in FIGS. 14E and F. FIG. 14F illustrates the final position of actuator rod 128 when the plug and receptacle units are completely coupled together.

Figures 15C, 15D:
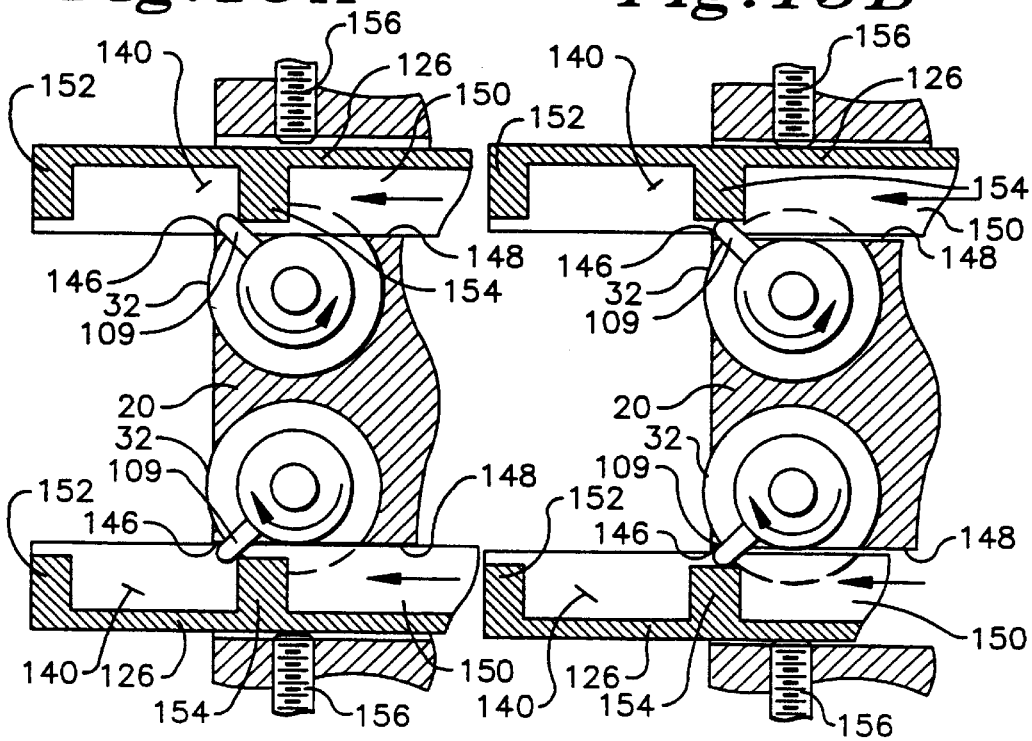

While the rod 128 is extending into the receptacle unit at the larger end portions of the rolling seals 88, rods 126 at the same time will start to enter the ports 120, and in doing so travel progressively through chambers or regions 140 of the plug manifold as the manifold continues to be pushed inwardly further into shell 14. The progress of rods 126 through region 140 of the plug manifold is illustrated in successive stages in FIGS. 15A–F. In FIG. 15B, the actuator flanges or tabs 154 on the inner faces of each rod 126 have just begun to engage the projecting tabs 109 of the two seals 32, which extend into ports or passages 124 as illustrated. As the manifold is pushed further inward, the flanges or tabs 154 push the tabs 109 forwardly, simultaneously causing rotation of the seals about their longitudinal axes in the direction of the arrows in FIGS. 15B–D. In FIG. 15D, tabs 109 contact the forward end wall of recessed region 140 to prevent any further rotation. In this position, the ports 110,114 will be in an open position aligned with bores 28, as illustrated in FIG. 32.

The relationship between the actuator portions 154 and 160 of the rods 126 and 128 is such that the receptacle and plug rolling seals are actuated simultaneously and in opposite directions. As noted above, in FIG. 31 the two units are shown in an intermediate position in which the manifold end faces are in face to face engagement and the receptacle shell has not yet pushed the plug manifold inwardly. As the units move from the position of FIG. 31 to that of FIG. 32, in which the plug manifold has been pushed partially inwardly, the rolling seals have all been rolled through 90° so that the bores are all open and connected from the receptacle unit into the plug unit. Prior to movement into the open position, the rolling seal through bores will all be filled with dielectric fluid via the bleed ports. If any debris is trapped between the mating end faces of the rolling seals in FIG. 31, it will be rolled outwardly to one side of the seals as these faces rotate, and away from the region of the aligned bores. The dielectric fluid filling the seal bores as they rotate into the open position will help to prevent any seawater from entering the bores.

Figures 15E, 15F, 15G, 15H:
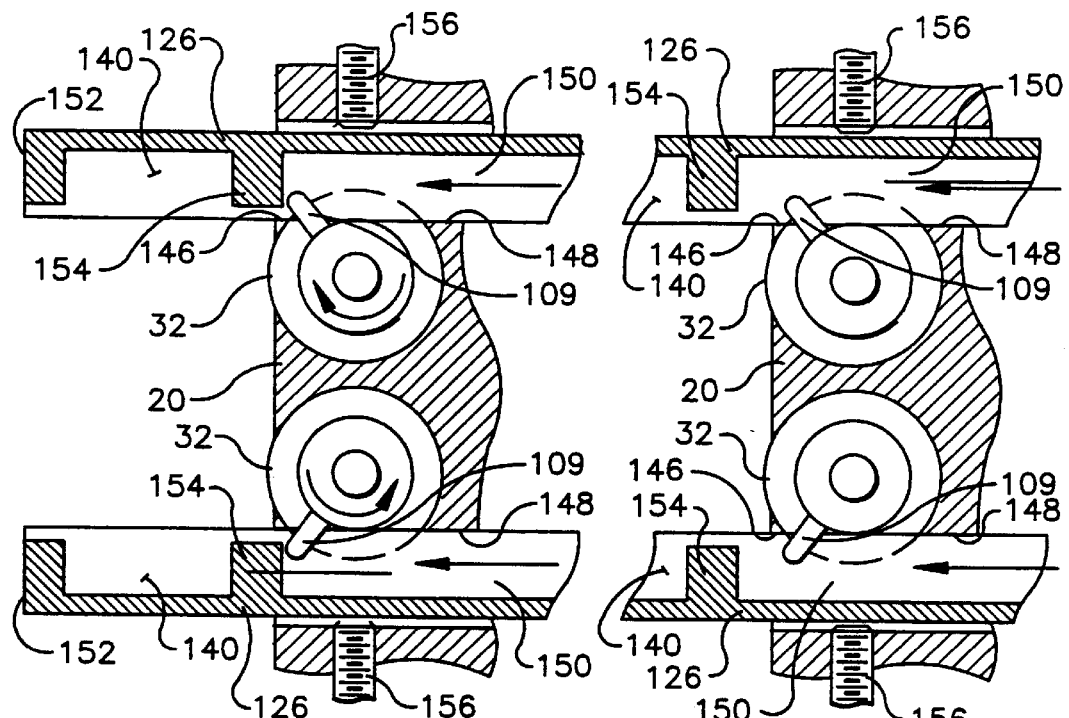

The two actuator rods 126 are mounted so as to be angled slightly outwardly and away from one another. As the rods are pushed further through ports 120, set screws 156 which project into ports 124 constrain the rods to move inwardly towards one another, such that the actuator flanges or tabs 154 fully engage and move the tabs 109. Once clear of the set screws, the rods can spring out again, providing sufficient clearance for the tabs 154 to pass over the ends of tabs 109, as indicated in FIGS. 15D and E. FIG. 15F illustrates the final position of rods 126 after entering ports 120.

As the mating sequence progresses beyond the point illustrated in FIGS. 14C, 15C and 32, the plug manifold is pushed further inwardly and the plug electrical and optical contacts will pass through the aligned ports 114 of the rolling seals 32 and 88, eventually penetrating alignment sleeves 86 and making contact with the electrical sockets 77 and the faces of optical ferrules 81, respectively, within the fluid bath of the receptacle. The fully engaged connector is illustrated in FIG. 33, while FIGS. 25 and 29, respectively, illustrate the mated condition of the electrical and optical contact in more detail. It can be seen that the spring 24 is compressed and the enlarged diameter portion of the receptacle shell has bottomed out on the end rim 18 of the plug shell. When passing through the rolling end seals, the tubular contact housings 40 of the plug will expand the elastomeric bores 114 of the rolling seals, so that the bores grip and seal to the outer surfaces of the tubular contact housings. A double seal is provided in both the plug and receptacle, trapping a closed bath of fluid within the end seals. Double end seals are considered to be advantageous for electrical connectors as well as optical connectors.

As the connector units are mated together, the relative movement between the units leading to the engagement of the plug and receptacle contact elements or ferrules will cause the volume within the oil chambers or baths of the plug and receptacle to change. These changes, in addition to changes which may occur due to variations in temperature and pressure, are compensated by flexing of the thin walled elastomeric baffles or bladders 57,58,97,98, which thereby change their shape to accommodate such volume changes. These compensators vent to the outside environment via the vent ports 50 and 68.

Any standard coupling device may be used to retain the connected plug and receptacle unit in their connected condition as in FIG. 19, as will be understood by those skilled in the field.

The locking collect or sleeve 145 on the plug manifold has a releasable snap-lock engagement with the outer shell 61 of the receptacle unit in order to hold the end faces in sealing engagement when the rolling seals are in the open position, and prevent separation of the end faces until the seals are rolled back into a closed position. As best illustrated in FIGS. 1 and 30 to 33, the locking collect is a generally cylindrical sleeve member with internal screw threads 170 at its inner end which are threadably engaged over the external threads 144 on the end of the plug manifold. A forward end portion of the collect projects forwardly from the front end face of the plug manifold. A plurality of spaced, resilient fingers 172 are provided by means of a series of inwardly directed slots 174 at the forward end of the collect. The collect has an inwardly projecting annular rib 175 adjacent the open forward end, which extends across the fingers 172. The outer shell 61 of the receptacle unit has a corresponding annular groove 176 spaced from the front end face of receptacle manifold 65 by a distance equal to the spacing of rib 175 from the front end face of plug manifold 20.

As the plug and receptacle units are coupled together, the fingers 172 will engage over the shell 61, as indicated in FIG. 31. The fingers will be resilient or springy, so that they are biased outwardly as they travel over the shell. The annular rib 175 will snap into groove 176 prior to opening of the rolling seals, locking the end faces of the manifolds together in sealing engagement prior to opening of the passageways 114,110 through the rolling seals.

The outer shell 14 of the plug unit has a bore with a larger diameter outer end portion 178 and a smaller diameter portion 179 separated by an annular step or shoulder 180. Prior to connection of the plug and receptacle units, when the plug rolling seals are closed as in FIG. 1, the locking collect will be positioned such that the rib 175 is positioned in the larger diameter portion 178 of the plug shell bore. As the receptacle and plug units are coupled together, the rib 175 will snap into groove 176 before the spring 24 starts to compress. As the receptacle manifold pushes the plug manifold back and the rolling seals start to move, the locking rib 175 will be pushed back into the smaller diameter portion 179 of the bore, as illustrated in FIG. 32, such that the plug manifold is locked together with the receptacle manifold and shell.

When the units are separated, the plug and receptacle manifolds will be coupled together by locking collect 136 until the locking rib 175 again reaches the larger diameter portion 178 of the plug shell bore, at which point the rolling seals will be closed. The two manifolds can then be separated, with the rib 175 forced out of groove 176, without any risk of seawater entering the seals.

As the units are demated, the movements of the plug contacts and seal actuator rods are reversed, with the actuator rods acting to rotate all the rolling seals back in the opposite direction until they are in the fully closed position of FIGS. 1, 2 and 30 again. This arrangement will prevent any seawater from entering the sealed oil chambers of the plug or receptacle as these units are mated and demated.

The operation of the actuator rods 128,126 as the plug and receptacle manifolds move outwardly relative to the plug shell bore as the units are demated is illustrated in FIGS. 14G–J and FIGS. 15G–J, respectively. As the receptacle unit is moved out of the plug shell bore, the plug manifold will be urged outwardly also under the action of spring 24. Thus actuator rods 126,128 will begin to move out of the receptacle manifold ports 20 and 22, and back into the plug manifold ports 124,125. As indicated in FIG. 14G, as the rod 128 moves in the direction of the arrow out of port 122, the actuator projections 160 on the ends of the tines 158 will contact the rolling seal tabs 109. The rod 128 continues to move out of the port, pushing the tabs 109 to the right as viewed in FIGS. 14G and H, until they contact the forward end wall 148 at the junction between chamber 140 and port 122, as indicated in FIG. 14H. This prevents the tabs from moving any further. During this movement, the rolling seals 88 are rolled back from their open position as in FIG. 33 to the closed position as in FIGS. 2, 30 and 31. The tines are then pushed together as indicated in FIG. 14I so that projections 160 can pass over the tabs 109 and the rod 128 can move completely out of port 122 and back into the aligned port 125 in the plug manifold, as indicated in FIG. 14J. At this point, the collect sleeve has released the receptacle shell and the plug and receptacle manifolds can be separated.

Simultaneously with the operation of rod 128 to close seals 88, the rods 126 will be rotating the seals 32 into the closed position, as indicated in FIGS. 15G–J. As the rods 126 start to move out of the receptacle ports 120 and back into the aligned plug ports 124, the actuator flanges 154 will again contact the rolling seal tabs 109, as illustrated in FIG. 15G. At the same time, the screws 156 will start to bias each of the rods 126 inwardly to ensure proper operation of the tabs. The rods 126 continue to move into the ports 124, so that the flanges 154 push the tabs 109 to the right in the direction of the arrows in FIGS. 15G and H, until the tabs 109 contact the rear end wall of chambers 140, which acts as a stop. This simultaneously rotates the rolling seals 32 from the open to the closed position. Once the flanges 154 are clear of the screws 156, they are able to spring outwardly a short distance which is sufficient to clear the tabs 109, as indicated in FIG. 15I, and the rods 126 then move back to the start position in which the end wall 152 is flush with the front end face of the plug manifold block, as illustrated in FIG. 15J.

It will be understood that many alternative mechanisms may be used to actuate the rolling seals. For example, the cam-like engagement between the actuator rod flanges and projections and the rolling seal tabs may be replaced with rack and gear wheel mechanism, with the end portions 106 having gear teeth and the actuator rods being replaced with rack gears. Other alternative actuator mechanisms may be used, such as a keying mechanism or other cam devices.

The rotating seal members are cylindrical in the preferred embodiment, but other alternative shapes may be used which have rounded mating surfaces for permitting the seal members to rotate in their mating seats. For example, the seal members may be spherical in a single contact connector.

The seals in this invention act in the manner of a plug valve to move physically between sealed and open positions only when the plug and receptacle unit are secured together, so that the seal is much more reliable than previous arrangements which required the seal to close on itself and thus became less reliable as the elastomeric material lost its "memory". It will be understood that rollable shapes other than cylindrical may be used for the mating seals and recesses, such as spherical or part-spherical. The arrangement of this invention provides a double end seal in each of the units which traps a fluid bath within the body of each end seal, further resisting entry of any moisture into the seal units.

Although rolling seals are used in the preferred embodiment described above, elongate seal members which shift back and forth axially across the front end of the respective connector units may be used in alternative embodiments. In this case, each seal member will be slidably mounted in a seat extending transversely across a front end wall of the connector unit, retained behind an end plate with openings aligned with the contact bores. Suitable actuators will be used to move each seal member between an inoperative position in which openings in the seal member are offset from the end plate openings and an operative position in which the seal openings are aligned with the end plate openings.

Although a preferred embodiment of the invention has been described above by way of example only, it will be understood by those skilled in the field that modifications may be made to the disclosed embodiment without departing from the scope of the invention, which is defined by the appended claims.

We claim:

1. A connector assembly, comprising:
   a receptacle unit having a rear end, a front end, and a longitudinal axis, at least one bore extending inwardly from the front end of the receptacle unit;
   the front end of the receptacle unit having at least one recessed seat and said bore terminating in said seat;
   a receptacle contact element mounted in said bore;
   a seal member movably mounted in said seat, the seal member having at least one through bore, and being movable in a non-axial direction relative to said receptacle unit between a first, closed position in which said through bore is offset from said receptacle bore and the end of said receptacle bore is sealed, and a second, open position in which said seal through bore is aligned with said receptacle through bore;
   a plug unit having a rear end and a front end for engagement with the front end of the receptacle unit, the front end of the plug unit having at least one opening aligned with the bore in the receptacle unit and a contact element slidably mounted in the plug unit for projecting out of the opening and through the seal member bore into the receptacle unit bore to contact the receptacle contact element when the seal member is in the open position; and
   an actuator slidably mounted in the plug unit for projecting out of the front end of the plug unit into the receptacle unit to move the seal member from the closed position to the open position prior to entry of the contact element into the seal member bore.

2. The assembly as claimed in claim 1, wherein the front end of the receptacle unit has two recessed seats and two bores, each bore terminating in a respective one of the seats, a receptacle contact element mounted in each bore, and two seal members, each seal member being movably mounted in a respective one of the seats, and the actuator and seal members have interengageable formations for engagement as the actuator enters the receptacle unit to move both seal members simultaneously from the closed to the open position, and back from the open to the closed position as the actuator is moved out of the receptacle unit on disconnection of the plug and receptacle units.

3. The assembly as claimed in claim 2, wherein each seal member is cylindrical and each seat is part-cylindrical, the seal through bores extending transversely through the respective seal members, each seal member being rotatably mounted in the respective seat and having an end portion projecting out of the seat for engagement by said actuator.

4. The assembly as claimed in claim 1, wherein the front face of the plug unit has a recessed seat and the plug unit bore terminates in said plug unit seat, and a plug seal member is mounted in said recessed seat of said plug unit, said plug seal member having a through bore and being movable between an open position in which said through bore is aligned with said plug unit bore and a closed position in which said through bore is offset from said plug unit bore and said plug unit bore is sealed, and a second actuator is movably mounted in said plug unit for movement relative to said plug unit to actuate said plug seal member as the units are coupled together to move the plug seal member from the closed position to the open position, and move the plug seal member back from the closed position to the open position as the units are uncoupled.

5. The assembly as claimed in claim 4, wherein said plug unit has first and second actuator mounting bores, said receptacle unit actuator comprises a first actuator rod mounted in the first actuator mounting bore, said second actuator comprises a second actuator rod mounted in the second actuator mounting bore, and said receptacle unit has first and second actuator ports aligned with said first and second actuator mounting bores, respectively, for receiving said actuator rods as they move out of said plug unit into said extended position.

6. The assembly as claimed in claim 5, wherein each seat comprises a part-cylindrical recess having an axis extending perpendicular to said longitudinal axis, and each seal comprises a cylindrical seal member rotatably mounted in said recess, said seal member through bores extending transversely through said seal members, said seal members each having a projecting portion projecting out of said recess, the projecting portion of the receptacle unit seal member projecting into the first actuator ports for actuation by said first actuator rod, and the projecting portion of said plug unit seal member projecting into the second actuator mounting bore for engagement by said second actuator rod.

7. The assembly as claimed in claim 6, wherein the projecting portions of said seal members each comprise a radially projecting tab, and each of said actuator rods has a projecting tooth for engaging the respective tab as said rods move between said retracted and extended positions, and back from said extended positions to said retracted positions.

8. The assembly as claimed in claim 4, wherein each seal member projects partially outwardly from the front end of the plug and receptacle unit, respectively, whereby said projecting portions are compressed when the units are positioned with the front ends in mating engagement.

9. The assembly as claimed in claim 4, wherein each seal member is cylindrical and each seat is of part-cylindrical shape and of dimensions substantially matching the dimensions of said seal members.

10. The assembly as claimed in claim 9, wherein each seal member comprises a rigid core rod and an elastomeric sleeve mounted on said core rod.

11. The assembly as claimed in claim 10, wherein said rigid core rod has at least one end portion projecting from one end of said sleeve, and each seat has a central opening at one end for rotatably receiving said projecting end portion to rotatably position said elastomeric sleeve in said seat.

12. The assembly as claimed in claim 10, wherein said rigid core rod has an enlarged end portion outside said sleeve at one end of the sleeve, and a radially projecting tab on said enlarged end portion, and each of said plug and receptacle units has a recessed region at said front end and an opening connecting said seat to said recessed region, said enlarged end portion being located in said recessed region.

13. The assembly as claimed in claim 12, wherein said recessed region in said receptacle unit is located at one end of said seat and said recessed region in said plug unit is located at the opposite end of the plug unit seat when said front faces are oriented for mating engagement between said plug and receptacle units.

14. The assembly as claimed in claim 13, wherein said plug unit has at least two actuator rod mounting bores and said receptacle unit has at least two actuator rod receiving bores aligned with said mounting bores, a first one of said actuator rod mounting bores extending into said recessed region of said plug unit and the second one of said actuator rod mounting bores being aligned with the recessed region of said receptacle unit, and first and second actuator rods slidably extending through said first and second actuator rod mounting bores, respectively, said rods being movable between a retracted position within said mounting bores and an extended position extending out of said bores and into said aligned receiving bores as said plug and receptacle units are secured together, the first rod comprising means for engaging the tab of the enlarged portion of the plug seal member to rotate the seal member from the closed to the open position as the rod moves from the retracted to the extended position, and the second rod comprising means for engaging the tab of the enlarged portion of the receptacle seal member and rolling the seal member from the closed to the open position as the rod moves from the retracted to the extended position.

15. The assembly as claimed in claim 4, including an actuator device for rotating said opposing seal members of said plug and receptacle unit in opposite directions in moving between said closed and open positions, whereby moisture or debris is propelled away from the seals.

16. The assembly as claimed in claim 1, wherein the receptacle unit has an internal chamber communicating with the contact element bore, the chamber and bore being filled with a benign fluid, and the seal member has at least one bleed port extending from one side of the member transversely into the seal through bore, the bleed port being aligned with the bore in the receptacle unit when the seal member is in the closed position, whereby the through bore is filled with fluid.

17. The assembly as claimed in claim 4, wherein said receptacle and plug units each have an internal chamber communicating with the respective contact element bore, the chamber and bore being filled with a benign fluid, and each seal member has at least one bleed port extending from the outer surface of said member transversely into the through bore, the respective bleed ports being aligned with the receptacle unit bore and plug unit bore and communicating with said bores in the closed position of said seal members, whereby each seal member through bore is filled with fluid.

18. The assembly as claimed in claim 17, wherein the plug and receptacle units each comprise an outer shell and a manifold mounted within the outer shell, each outer shell having a main chamber connected to the outside of the unit, and the internal chamber being located within the manifold, a dividing wall separating the main chamber from the internal chamber, the dividing wall having at least one port connected to a flexible bladder within the internal chamber of the manifold, whereby said bladder flexes inwardly and outwardly to provide pressure compensation between the pressure of fluid inside and outside the seal unit.

19. The assembly as claimed in claim 18, wherein two flexible bladders are located within each manifold internal chamber, and the dividing wall has two ports connecting the main chamber to the respective bladders.

20. The assembly as claimed in claim 19, wherein each dividing wall comprises a seal member of resilient material formed integrally with said flexible bladders, and an end plate secured to said manifold across said seal member, the end plate and seal member having aligned openings through which said respective contact elements project, said seal member comprising a Morrison seal about said contact element.

21. A connector assembly, comprising:

a plug unit having a rear end and a front end, and a first bore extending to the front end of the plug unit, the front end having a first recessed seat of enlarged dimensions into which said first bore extends;

at least one contact element slidably mounted in said first bore for movement between a retracted position within said bore and an extended position projecting forwardly through the front end of the plug unit;

a first seal member movably mounted in said recessed seat, the seal member having a through bore and being movable between an open position in which said through bore is aligned with said first through bore and a closed position in which said through bore is offset from said first through bore and the first through bore is sealed;

a receptacle unit having a rear end and a front end for engaging the front end of the plug body in a predetermined orientation when the receptacle and plug units are connected together;

a second bore extending inwardly into said receptacle unit from said front end, the front end of the receptacle unit having a second recessed seat of shape and dimensions matching those of said first recessed seat, the second bore extending into said second recessed seat and being aligned with said first bore when said plug and receptacle unit are positioned in said predetermined relative orientation for mating engagement;

at least one contact element mounted in said second bore;

a second seal member movably mounted in said second recessed seat, the second seal member having at least one through bore and being movable between an open position in which said through bore is aligned with said second bore and a closed position in which said through bore is offset from said second bore and said second bore is sealed;

an actuator mechanism for actuating each of said seal members to move from said closed to said open position as said receptacle unit is connected to said plug unit; and said actuator mechanism comprising at least two actuator members slidably mounted in said plug unit for projecting out of the front end of the plug unit into the receptacle unit as the units are secured together;

a first one of said actuator members comprising means for moving said first seal member between said closed and open positions, and a second one of said actuator members comprising means for moving said second seal member between said closed and open positions as said units are connected together;

whereby said plug contact element projects through the aligned through bores in said open seal members and into said second bore to engage said receptacle contact element.

22. The assembly as claimed in claim 21, wherein the recessed seats each have a cross-sectional area less than the cross-sectional area of the seal members, and each seal member has a portion projecting outwardly from the recessed seat and the front end of the respective unit, whereby said projecting seal portions are compressed when said front ends are positioned in face to face engagement prior to connection of said units.

23. The assembly as claimed in claim 21, wherein said plug and receptacle units each have an internal sealed chamber connected to said respective contact element bores, the sealed chamber and contact element bores being filled with a benign fluid, and each seal member has a bleed port connecting said through bore to said sealed chamber in the closed position of the seal member, whereby the seal member through bores are filled with fluid from said chambers in the closed position of said seal members.

24. The assembly as claimed in claim 21, wherein each recessed seat has a curved surface and each seal member has a matching curved surface and is rotatably mounted in said respective seat for rotation between said closed and open positions.

25. The assembly as claimed in claim 24, wherein each seal member comprises a cylindrical roller rotatably mounted in the respective seat having at least one transverse through bore, and each recessed seat is of part-cylindrical shape and dimensions substantially matching the dimensions of the cylindrical roller, whereby said roller is rotatable about its longitudinal axis to move said seal member from the closed to the open position.

26. The assembly as claimed in claim 25, wherein each seal member comprises a rigid central rod and an elastomeric roller mounted on said rod with an end portion of said rod projecting from one end of said roller to form said projecting shaft.

27. The assembly as claimed in claim 25, wherein the plug unit and receptacle unit each have a set of spaced parallel bores aligned with corresponding bores in the other unit and each terminating in said recessed seat, each bore containing a respective contact element, and said cylindrical rollers each have a plurality of spaced parallel transverse through bores, each transverse through bore being aligned with a respective bore in the respective plug and receptacle units in the open position of said seal member.

28. The assembly as claimed in claim 27, wherein the plug unit and receptacle unit each have multiple sets of spaced parallel bores aligned with corresponding bores in said multiple sets of bores in the other unit, the front end of t he plug unit and receptacle unit each having a plurality of recessed seats, each set of bores terminating in a respective one of the recessed seats, and a rotating seal member is rotatably mounted in each of the recessed seats of the plug and receptacle unit, respectively.

29. The assembly as claimed in claim 24, wherein said first actuator member has an actuator portion for engaging and rotating the first seal member in a first direction between the closed and open positions and the second actuator member has an actuator portion for engaging and rotating the second seal member in a second direction opposite to the first direction between the closed and open positions.

30. The assembly as claimed in claim 29, wherein said plug and receptacle units each have an enlarged chamber adjacent one end of said recessed seat, each seat having an opening at said one end communicating with said chamber, and each seal member has an end portion projecting through said opening into said chamber, said plug unit having at least two parallel actuator bores extending through said front end, at least one of said actuator bores intersecting said enlarged chamber in said plug unit, said receptacle unit having at least two parallel actuator bores aligned with the actuator bores in said plug unit, at least one of said actuator bores in said receptacle unit intersecting said enlarged chamber at the front end of said receptacle unit, said first and second actuator members each comprising an actuator rod, each actuator rod being slidably mounted in a respective one of said actuator bores and being movable between a retracted position within said bore and an extended position projecting out of the front end of the plug unit and into the aligned actuator bore in said receptacle unit, said first actuator portion comprising a projection on a first one of said actuator rods which extends through the enlarged chamber in the plug unit and the second actuator portion comprising a projection on a second one of said actuator rods which extends into the enlarged chamber of the receptacle unit when in said extended position, said actuator portions comprising means for engaging the end portions of the respective seal members to rotate said seal members as said rods move from the retracted to the extended positions.

31. The assembly as claimed in claim 21, wherein said plug unit comprises a hollow shell with a fixed rear end and an open front end, and a plug body slidably mounted in the shell, the plug body having a rear end and a forward end face defining the front end of said plug unit;

said first bore comprising a through bore extending through the plug body;

said first contact element having a first end secured to the rear end of the plug unit and projecting forwardly into the through bore;

the receptacle unit being dimensioned for engagement in said hollow shell to push said plug body rearwardly as said units are connected together, whereby said contact element projects out of the front end of the plug body into the receptacle unit bore;

the plug body having first and second actuator through bores spaced from the first bore and extending tangential to the rolling seal member;

the receptacle unit having first and second actuator ports aligned with said actuator through bore in said predetermined relative orientation; and the actuator members comprising a first actuator rod having a first end secured to the rear end of the plug shell and projecting forwardly into said first actuator through bore, and a second actuator rod having a first end secured to the rear end of the plug shell and projecting forwardly into said second actuator through bore, whereby said actuator rods project out of said actuator through bores and into said actuator ports in said receptacle unit when said units are connected together;

each actuator rod having a projection and each seal member having a tab for engagement by the projection on the respective actuator rod to move the seal member from the closed to the open position as said actuator rods are pushed out of said plug unit and into said receptacle unit.

32. The assembly as claimed in claim 31, wherein the plug and receptacle unit each have at least two sets of spaced parallel bores aligned with corresponding bores in said two sets of bores in the other unit, the front end of the plug unit and receptacle unit each having two recessed seats, each set of bores terminating in a respective one of the recessed seats, and a rotating seal member is rotatably mounted in each of the recessed seats of the plug and receptacle unit, respectively, the plug body having a third actuator through bore and the receptacle unit having a third actuator port aligned with said third actuator through bore, a third actuator rod having a first end secured to the rear end of the plug shell and projecting forwardly into said third actuator through bore, said first and third actuator rods being identical and comprising means for rotating the seal members in said plug unit from said closed to said open position, and the second actuator rod having first and second opposing projections for engaging the tabs on the respective receptacle seal members to open said seal members when the units are secured together.

33. The assembly as claimed in claim 32, wherein the second actuator rod has a second end comprising a pair of forks, the first projection being located on one of said forks and the second projection being located on the other fork.

34. The assembly as claimed in claim 32, wherein said first and third actuator rods are each of L-shaped cross-section along at least part of their length, with a recessed side formed by said L-shape, the rods being oriented with their recessed sides facing one another, and said projections are located in said recessed sides.

35. The assembly as claimed in claim 31, including a locking sleeve projecting forwardly from said forward end face of said plug body, said locking sleeve and said receptacle unit having releasable locking formations for releasably securing the plug body and receptacle unit in face to face engagement when said seal members are in the open position, said plug shell including release means for releasing said locking sleeve from said receptacle unit when the seal members are returned to the closed position, whereby said forward end faces can only be separated when said seal members are closed.

* * * * *